United States Patent
Chopra et al.

(10) Patent No.: US 8,702,221 B2
(45) Date of Patent: *Apr. 22, 2014

(54) GELLANT COMPOSITIONS WITH AROMATIC END-CAPS AND OLIGOMERIC MOLECULAR WEIGHT DISTRIBUTIONS

(75) Inventors: Naveen Chopra, Oakville (CA);
Michelle N. Chretien, Mississauga (CA); Barkev Keoshkerian, Thornhill (CA); Daryl Vanbesien, Burlington (CA); Jenny Eliyahu, Maple (CA); Jennifer L. Belelie, Oakville (CA); Peter Odell, Mississauga (CA)

(73) Assignee: Xerox Corporation, Norwalk, CT (US)

( * ) Notice: Subject to any disclaimer, the term of this patent is extended or adjusted under 35 U.S.C. 154(b) by 78 days.

This patent is subject to a terminal disclaimer.

(21) Appl. No.: 13/466,488

(22) Filed: May 8, 2012

(65) Prior Publication Data
US 2013/0300796 A1    Nov. 14, 2013

(51) Int. Cl.
*B41J 2/01*    (2006.01)
(52) U.S. Cl.
USPC .......................................... 347/100
(58) Field of Classification Search
USPC .......................................... 347/100
See application file for complete search history.

(56) References Cited

U.S. PATENT DOCUMENTS

| | | |
|---|---|---|
| 4,490,731 A | 12/1984 | Vaught |
| 5,195,430 A | 3/1993 | Rise |
| 5,231,135 A | 7/1993 | Machell |
| 5,621,022 A | 4/1997 | Jaeger |
| 5,783,657 A | 7/1998 | Pavlin |
| 6,111,055 A | 8/2000 | Berger |
| 6,221,137 B1 | 4/2001 | King |
| 7,186,762 B2 | 3/2007 | Wong |
| 7,279,584 B2 | 10/2007 | Tomisawa |
| 7,279,587 B2 | 10/2007 | Odell |
| 7,296,614 B2 | 11/2007 | Schlichting |
| 7,559,639 B2 | 7/2009 | Belelie |
| 2006/0122415 A1* | 6/2006 | Carlini et al. .................... 560/25 |
| 2007/0120910 A1* | 5/2007 | Odell et al. ...................... 347/88 |
| 2008/0218540 A1 | 9/2008 | Iftime |
| 2011/0152397 A1 | 6/2011 | Breton |
| 2011/0196057 A1 | 8/2011 | Breton |
| 2011/0196058 A1 | 8/2011 | Breton |
| 2011/0263890 A1* | 10/2011 | Chopra et al. ................. 560/145 |

* cited by examiner

*Primary Examiner* — Laura Martin
(74) *Attorney, Agent, or Firm* — Pillsbury Winthrop Shaw Pittman LLP

(57) ABSTRACT

Disclosed herein are amide gellant compositions with aromatic end-caps consisting of a blend of oligomers (dimer, trimer, tetramer and pentamer) that may be optimized to stable gelling viscosity and controlled showthrough of printed inks.

14 Claims, 3 Drawing Sheets

FIG. 1

GELLANT COMPOSITIONS WITH AROMATIC END-CAPS AND OLIGOMERIC MOLECULAR WEIGHT DISTRIBUTIONS

BACKGROUND OF THE DISCLOSURE

Ink jet printing processes generally may employ inks that are solid at room temperature and liquid at elevated temperatures. Such inks may be referred to as solid inks, hot melt inks, phase change inks and the like. For example, U.S. Pat. No. 4,490,731, the disclosure of which is totally incorporated herein by reference, discloses an apparatus for dispensing solid ink for printing on a recording medium such as paper. In thermal ink jet printing processes employing hot melt inks, the solid ink is melted by the heater in the printing apparatus and utilized (jetted) as a liquid in a manner similar to that of conventional thermal ink jet printing. Upon contact with the printing recording medium, the molten ink solidifies rapidly, allowing the colorant to substantially remain on the surface of the recording medium instead of being carried into the recording medium (for example, paper) by capillary action, thereby enabling higher print density than is generally obtained with liquid inks. Advantages of solid inks in ink jet printing are thus elimination of potential spillage of the ink during handling, a wide range of print density and quality, minimal paper cockle or distortion, reduced print-through and enablement of indefinite periods of nonprinting without the danger of nozzle clogging, even without capping the nozzles.

Solid inks are desirable for ink jet printers because they remain in a solid phase at room temperature during shipping, long term storage, and the like. In addition, the problems associated with liquid ink such as jet nozzle clogging as a result of ink evaporation inks are largely eliminated, thereby improving the reliability of the ink jet printing. Further, in solid ink jet printers, wherein the ink droplets are applied directly onto the final recording medium (for example, paper, transparency material, and the like), the droplets solidify immediately upon contact with the recording medium, so that migration of ink along the printing medium is prevented and dot quality is improved.

Curable solid inks were conceived as a means to use conventional solid ink print process, especially transfix, and deliver an increase in mechanical robustness after curing. One of the challenges in formulating a suitable curable solid ink is to create a solid ink with sufficient molecular mobility to allow rapid and extensive curing. Previous formulations have been disclosed in, such as for example, U.S. Publication No. 2011/0196057 to Breton et al., which proposes use of an IGEPAL waxy derivative to increase cure speed. Reference is also made to U.S. Publication No. 2011/0152397 to Breton et al., U.S. Publication No. 2011/0196058 to Breton et al., and U.S. application Ser. No. 12/972,138 to Breton et al., the disclosures of which are incorporated herein by reference in their entireties.

Curable inks generally contain a gellant, such as a curable ester-terminated amide gellant that may be end-capped with a suitable molecule. Typical ester 'end-caps' on gellant molecules include specialty materials such as photoinitiators, acrylates, and aromatic alcohols such as benzyl alcohol and phenylethyl alcohol. U.S. Pat. No. 7,296,614 (Toma et al) discloses and claims curable amide gellants wherein the end caps have at least 1 ethylenically unsaturation. U.S. Pat. No. 7,279,584 (Odell et al) discloses and claims photoinitiators with phase change properties and gellant affinity, wherein the end caps have at least 1 photoinitiating group. U.S. Pat. No. 5,783,657 (Pavlin et al) and U.S. Pat. No. 6,111,055 (Berger et al) disclose and claim ester terminated polyamides for gelling of hydrocarbon solvents (i.e. candles), wherein the end caps have alkyl and alkenyl groups of at least 4 C atoms, such as C12-C22.

While the above conventional solid ink technology is generally successful in producing suitable solid inks, there is still a need for an improved curable solid inks that enable wide substrate latitude, excellent adhesion, and enhanced pigment dispersion stability.

Each of the foregoing U.S. patents and Patent Publications are incorporated by reference herein. Further, the appropriate components and process aspects of the each of the foregoing U.S. patents and Patent Publications may be selected for the present disclosure in embodiments thereof.

SUMMARY OF THE DISCLOSURE

Disclosed herein are novel gellant compositions comprising a blend of oligomers (e.g., dimer, trimer, tetramer, pentamer, etc.) of an ester-terminated polyamide resin. The blend and/or proportion of each oligomers in the oligomeric mixture may be optimized for use in the print process.

According to some embodiments, solid phase change ink compositions are provided characterized by being solid at room temperature and molten at an elevated temperature at which the molten ink is applied to a substrate. These solid ink compositions can be used for ink jet printing in a variety of applications.

According to some embodiments, there is provided a gellant oligomer mixture composition comprising a blend of oligomers of an ester-terminated polyamide gellant of the formula:

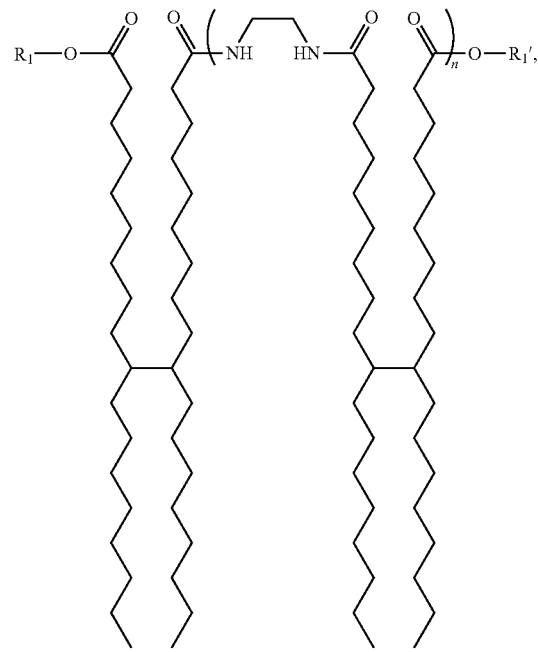

wherein n is 1 to 12, and wherein $R_1$ and $R_1'$ each, independently of the other, are aromatic groups selected from the group consisting of:

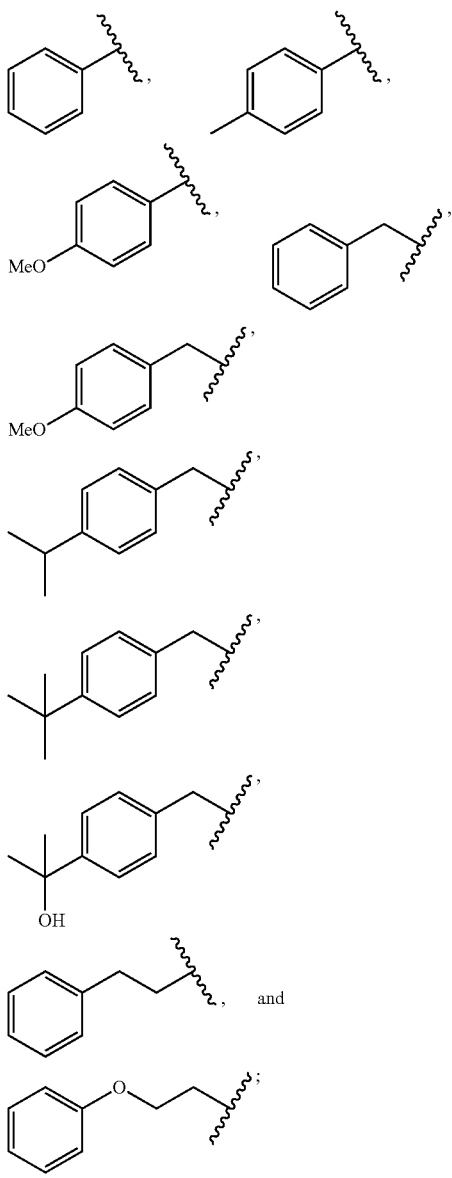

wherein the blend of a oligomers is selected from two or more of the group consisting of a unimer, a dimer, a trimer, a tetramer, a pentamer, a hexamer, a heptamer, a octamer, a nonamer, a decamer, a undecamer, and a dodecamer.

In some embodiments, the gellant oligomer mixture composition comprises a blend of oligomers made up of three or more, in any combination or mixture, of the oligomers selected from the group consisting of: a unimer, a dimer, a trimer, a tetramer, a pentamer, a hexamer, a heptamer, a octamer, a nonamer, a decamer, a undecamer, and a dodecamer.

In some embodiments, the gellant oligomer mixture composition comprises a blend of oligomers made up of four or more, in any combination or mixture, of the oligomers selected from the group consisting of: a unimer, a dimer, a trimer, a tetramer, a pentamer, a hexamer, a heptamer, a octamer, a nonamer, a decamer, a undecamer, and a dodecamer.

In some embodiments, the gellant oligomer mixture composition comprises a blend of oligomers made up of five or more, in any combination or mixture, of the oligomers selected from the group consisting of: a unimer, a dimer, a trimer, a tetramer, a pentamer, a hexamer, a heptamer, a octamer, a nonamer, a decamer, a undecamer, and a dodecamer.

In some embodiments, the gellant oligomer mixture composition comprises from about 40 to about 60% unimer, from about 15 to about 25% dimer, from about 7.5 to about 10% trimer, and from about 5 to about 7.5% tetramer.

According to some embodiments, there is provided an ink composition comprising the gellant oligomer mixture composition of the present embodiments.

According to some embodiments, there is provided a curable solid ink comprising a curable wax; one or more monomers; a gellant oligomer mixture composition, a photoinitiator, and an optional colorant, wherein gellant oligomer mixture composition comprises a blend of oligomers of an ester-terminated polyamide gellant of the formula:

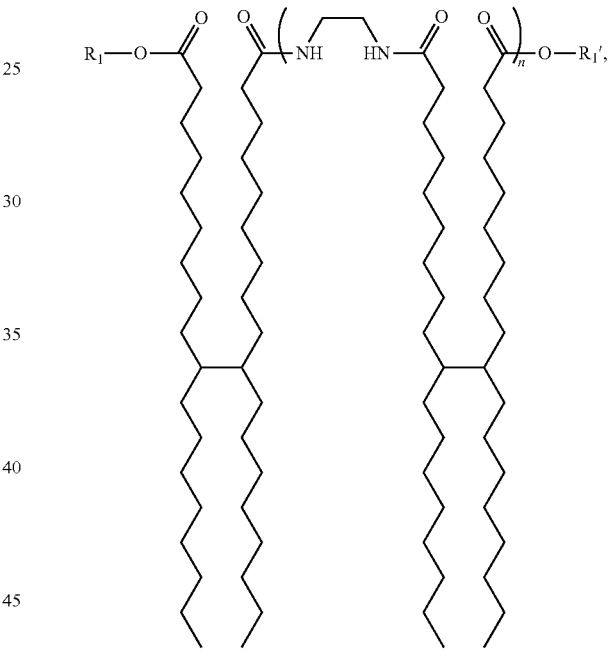

wherein n is 1 to 12, and wherein $R_1$ and $R_1'$ each, independently of the other, are aromatic groups selected from the group consisting of:

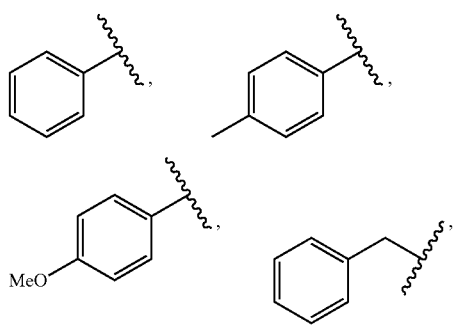

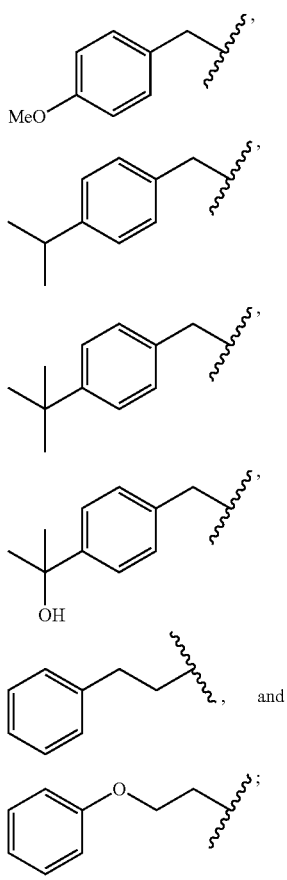

wherein the blend of a oligomers is selected from two or more of the group consisting of a unimer, a dimer, a trimer, a tetramer, a pentamer, a hexamer, a heptamer, a octamer, a nonamer, a decamer, a undecamer, and a dodecamer.

In some embodiments, the curable wax is present in the curable solid ink in an amount of from about 0.1 to about 30% by weight of the total weight of the curable solid ink. In some embodiments, the one or more monomers are present in the curable solid ink in an amount of from about 50 to about 95% by weight of the total weight of the curable solid ink. In some embodiments, the optional colorant is present in the curable solid ink in an amount of from about 0.1 to about 10% by weight of the total weight of the curable solid ink. In some embodiments, the gellant oligomer mixture composition is present in the curable solid ink in an amount of from about 1 to about 30% by weight of the total weight of the curable solid ink. In some embodiments, the photoinitiator is present in the curable solid ink in an amount of from about 0.5 to about 15% by weight of the total weight of the curable solid ink.

According to some embodiments, there is provided a method of jet printing an image, comprising: jetting a curable solid ink onto a print substrate to form an image; and exposing the image to radiation to cure the curable solid ink on to the print substrate, wherein the curable solid ink comprises a curable wax; one or more monomers; a gellant oligomer mixture composition, a photoinitiator, and an optional colorant, wherein gellant oligomer mixture composition comprises a blend of oligomers of an ester-terminated polyamide gellant of the formula:

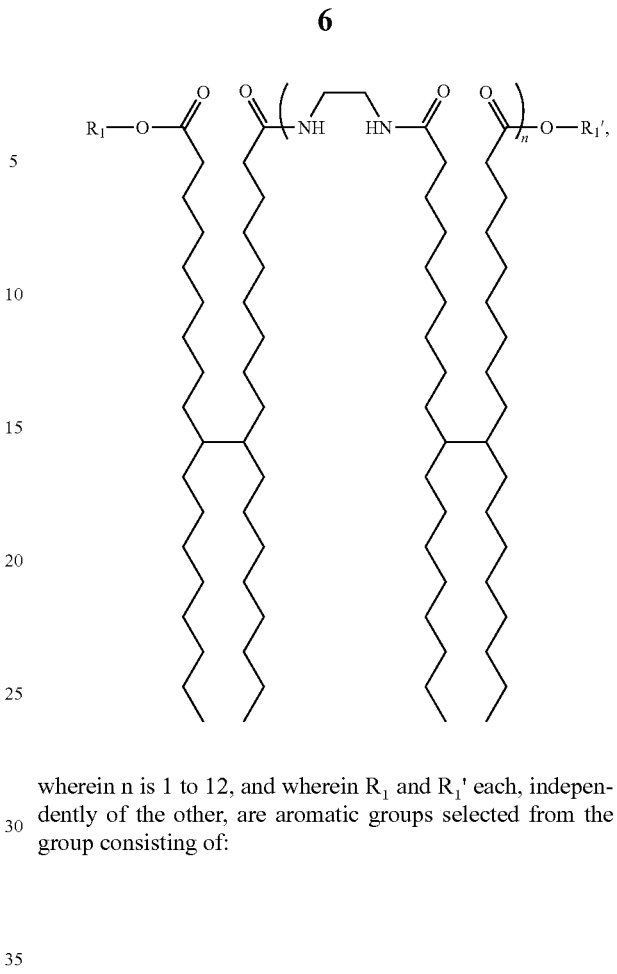

wherein n is 1 to 12, and wherein $R_1$ and $R_1'$ each, independently of the other, are aromatic groups selected from the group consisting of:

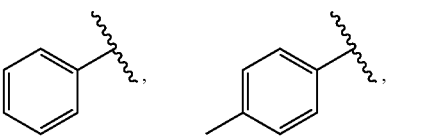

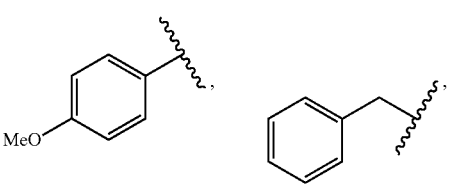

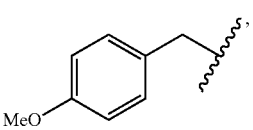

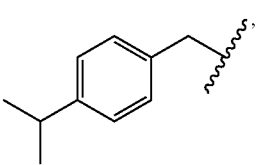

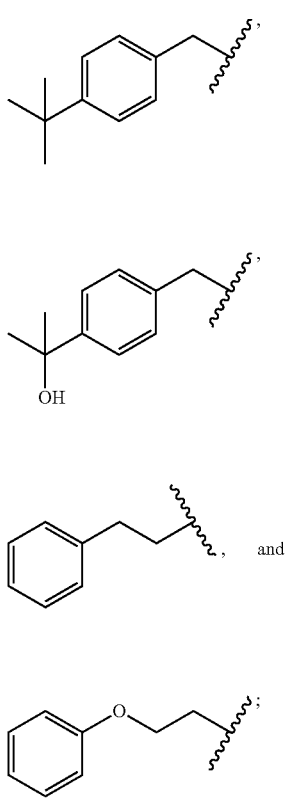

wherein the blend of a oligomers is consisting of a unimer, a dimer, a trimer, a tetramer, a pentamer, and a hexamer.

This application also discloses inks comprising the gellant oligomer mixture of the present embodiments. The properties of the inks comprising the gellant oligomer mixture composition (e.g., gel point, jetting viscosity, room temperature viscosity) may be optimized by altering the proportions of each oligomer in the gellant oligomer mixture. In some embodiments, the oligomer distribution may be controlled by varying the stoichiometry of the ethylenediamine (EDA) to Pripol dimer acid in the preparation of the amide gellant precursor (organoamide).

BRIEF DESCRIPTION OF THE DRAWINGS

Figure 1:
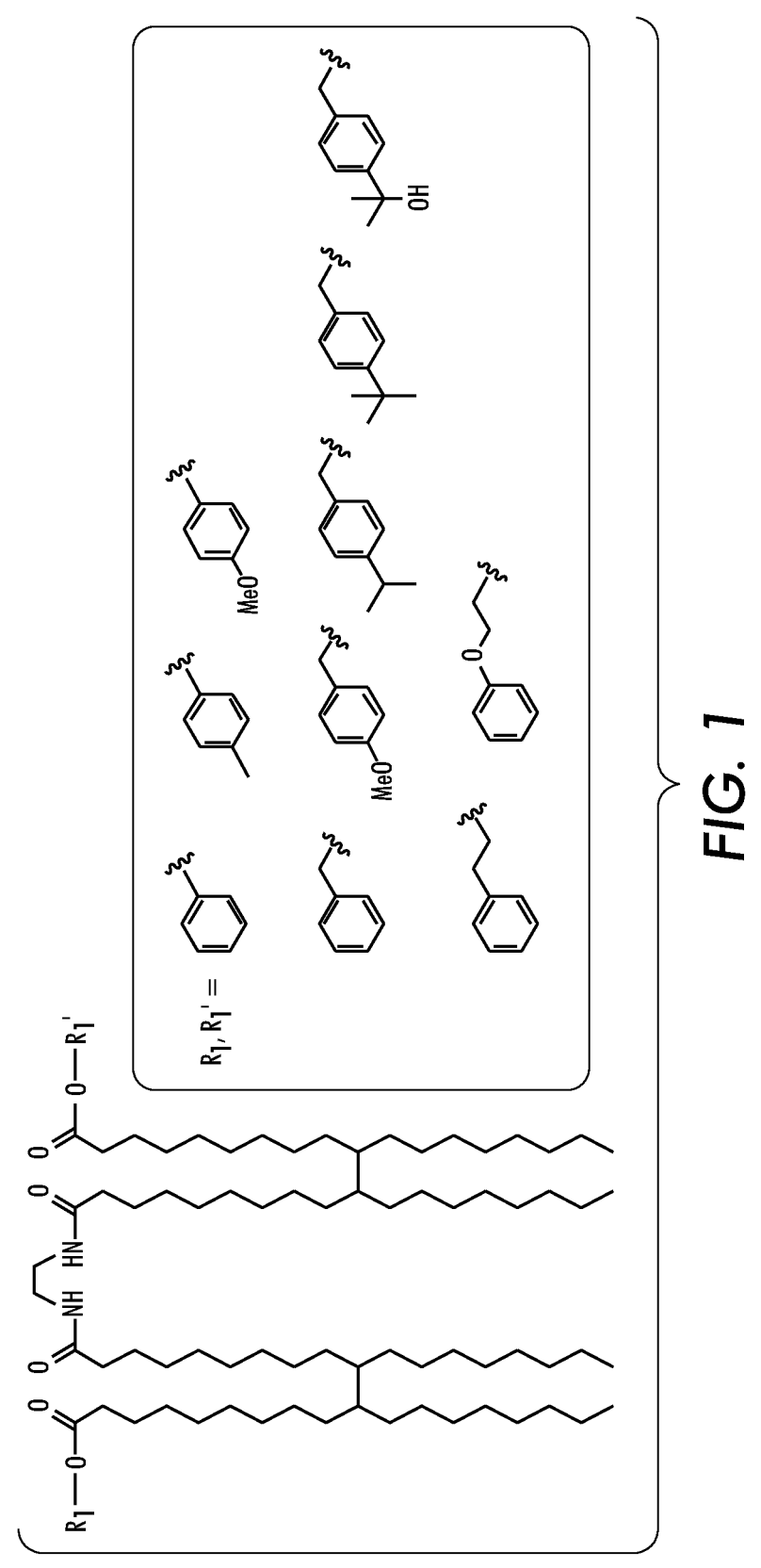

FIG. 1. Shows the generic structure of the amide gellant oligomer with exemplary end-caps.

DETAILED DESCRIPTION

Figure 2:
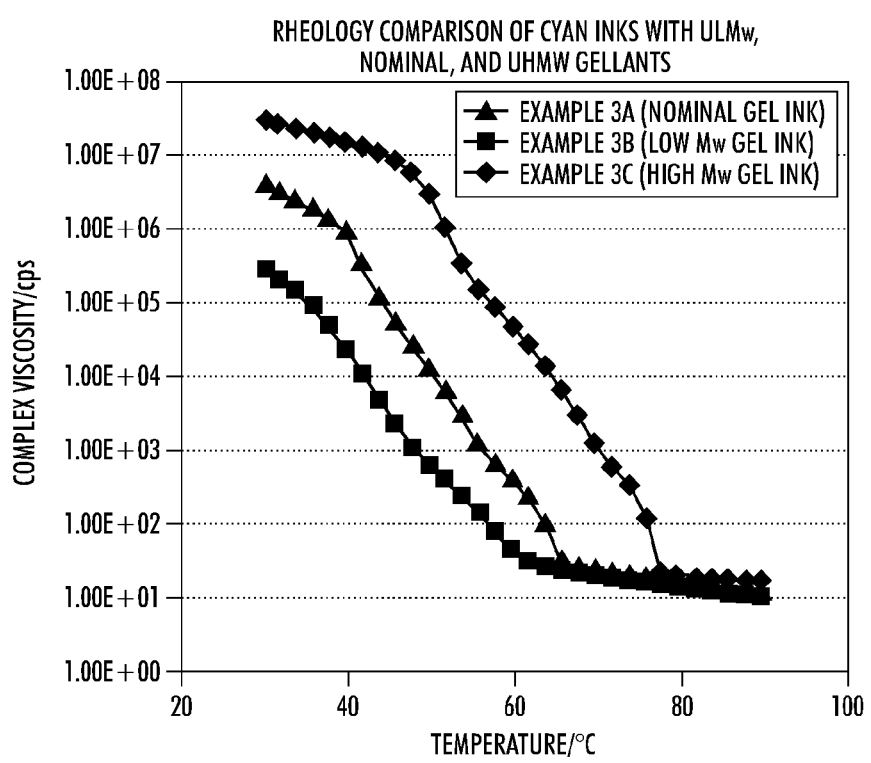
FIG. 2. Rheology comparison of cyan inks containing nominal low and high molecular weight gellant FIG. 3. Plot of Gel Point and Room Temperature Viscosity Trends vs. EDA:Pripol Ratio for Cyan Inks Containing Varying Molecular Weight Gellants.

The gellant oligomer mixture compositions of the present embodiments comprise a blend of oligomers or x-mers (e.g., monomers, dimer, trimer, tetramer, pentamer, etc.) of an ester-terminated polyamide resin. The generic structure of the ester-terminated polyamide gellant is as follows:

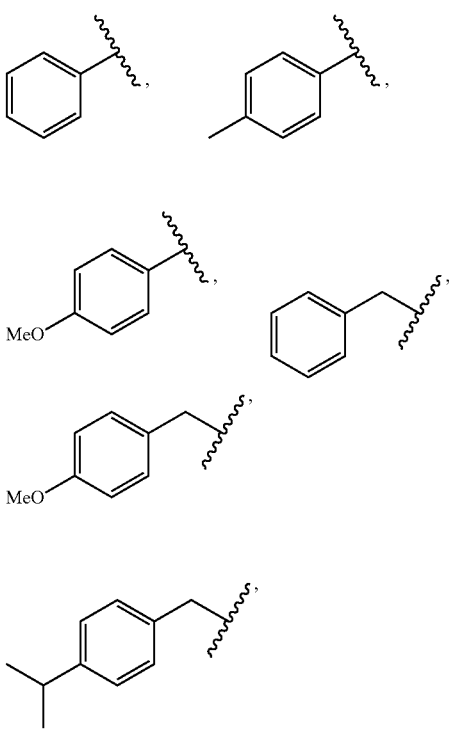

where n is about 0 to about 20, about 0 to about 15, or about 0 to about 10, and where R1 and R1' each, independently of the other, is a suitable end-capping group (e.g., an alcohol, aromatic, or aromatic alcohol group). In some embodiments, n is 1, 2, 3, 4, 5, 6, 7, 8, 9, 10, 11, 12, 13, 14, 15, 16, 17, 18, 19, or 20.

In some embodiments, R1 and R1' each, independently of the other, is an aromatic group selected from the group consisting of:

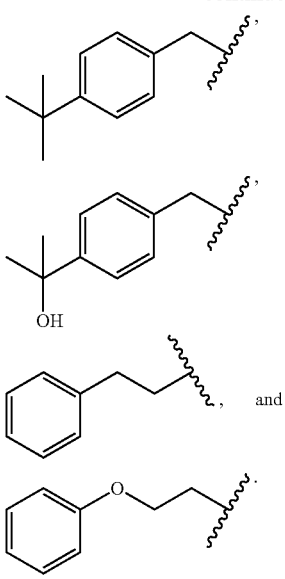

The gellant compositions of the present embodiments comprise a blend of oligomers or x-mers of an ester-terminated polyamide gellant disclosed herein. The blend oligomers or x-mers may include monomers or unimers, thus as used herein, the term "oligomer" or "x-mer" includes monomers or unimers in addition to molecules that consist of a plurality of monomers such as dimers, trimers, tetramers, pentamers, etc. The oligomeric amide gellant composition comprise discrete ranges of oligomers (also referred to as "x-mers") that provide optimal gel point and room temperature viscosity to enable stable jetting and controlled showthrough of the printed inks.

In some embodiments, the gellant oligomer mixture composition comprises a blend of oligomers made up of two or more (e.g. 2, 3, 4, 5, 6, 7, 8, 9, 10, 11, 12, or more) of the following in any combination or mixture: a unimer, a dimer, a trimer, a tetramer, a pentamer, a hexamer, a heptamer, a octamer, a nonamer, a decamer, a undecamer, and a dodecamer.

In some embodiments, the gellant oligomer mixture composition comprise a blend of oligomers made up of three or more of the following in any combination or mixture: a unimer, a dimer, a trimer, a tetramer, a pentamer, a hexamer, a heptamer, a octamer, a nonamer, a decamer, a undecamer, and a dodecamer.

In some embodiments, the gellant oligomer mixture composition comprises a blend of oligomers made up of four or more of the following in any combination or mixture: a unimer, a dimer, a trimer, a tetramer, a pentamer, a hexamer, a heptamer, a octamer, a nonamer, a decamer, a undecamer, and a dodecamer.

In some embodiments, the gellant oligomer mixture composition comprises a blend of oligomers made up of five or more of the following in any combination or mixture: a unimer, a dimer, a trimer, a tetramer, a pentamer, a hexamer, a heptamer, a octamer, a nonamer, a decamer, a undecamer, and a dodecamer.

In some embodiments, the proportion of each oligomer in the oligomeric mixture is equimolar. In some embodiments, the oligomeric mixture comprises more than one and up to 20 x-mers, wherein x is from about 1 to about 12, and the x-mer may be as described above, including a unimer, dimer, trimer and the like as listed above up to and including a dodecember. The proportion of any of the x-mers present in the oligomeric mixture may be from about including between about 0.5% to about 50%, between about 10% to about 50%, and between about 20% to about 50%.

The proportion of any of the x-mers present in the oligomeric mixture may be from about between about 0.5% to about 40%, between about 10% to about 40%, between about 15% to about 40%, between about 17% to about 40%, and between about 30% to about 40%.

The proportion of any of the x-mers present in the oligomeric mixture may be from about between about 0.5% to about 30%, between about 10% to about 30%, between about 15% to about 30%, between about 15% to about 27%, between about 20% to about 30%, The proportion of any of the x-mers present in the oligomeric mixture may be from about between about 0.5% to about 20%, between about 10% to about 20%, and between about 15% to about 20%.

The proportion of any of the x-mers present in the oligomeric mixture may be from about between about 0.5% to about 15%, between about 1% to about 15%, between about 2% to about 15%, between about 4% to about 15%, between about 5% to about 15%, between about 7% to about 15%, between about 10% to about 15%, and between about 12% to about 15%.

The proportion of any of the x-mers present in the oligomeric mixture may be from about between about 0.5% to about 10%, between about 1% to about 10%, between about 2% to about 10%, between about 4% to about 10%, between about 5% to about 10%, and between about 7% to about 10%.

The proportion of any of the x-mers present in the oligomeric mixture may be from about between about 0.5% to about 5%, between about 1% to about 5%, between about 2% to about 5%, between about 4% to about 5%, between about 0.5% to about 3%, between about 1% to about 3%, and between about 2% to about 3%.

In some embodiments, the blend and proportion of each oligomer in the oligomeric mixture is defined as follows:

Molecular Weight Distributions by MALDI-TOF of Amide Gellant

| n | Name | Percent ranges |
|---|------|----------------|
| 0 | Unimer | 40-60 |
| 1 | Dimer | 15-25 |
| 2 | Trimer | 7.5-10 |
| 3 | Tetramer | 5-7.5 |

In some embodiments, the amide gellant composition may further optionally comprise less than 2% of hexamer and/or heptamer. In some embodiments, the amide gellant composition may further optionally comprise less than 2% of a hexamer, a heptamer, a octamer, a nonamer, a decamer, a undecamer, and/or a dodecamer.

In some embodiments, oligomer distribution is controlled by varying the stoichiometry of the ethylenediamine (EDA) to Pripol dimer acid in the preparation of the amide gellant precursor (organoamide).

Curable Inks

The ink compositions of the present embodiments comprise a gellant oligomer mixture composition disclosed herein. The present disclosure also relates to curable inks comprising a gellant oligomer mixture composition of the present embodiments.

In some embodiments, the ink compositions of the present embodiments may be solid inks. Solid ink technology broadens printing capability and customer base across many markets, and the diversity of printing applications will be facilitated by effective integration of printhead technology, print process and ink materials. The curable solid ink compositions are characterized by being solid at room temperature, for example, 20-50° C. or 20-27° C., and molten at an elevated temperature at which the molten ink is applied to a substrate. The ink compositions of the present embodiments may be solid curable inks at room temperature both in the presence and absence of a gellant.

In some embodiments, the ink compositions may further optionally comprise one or more of the following: curable waxes, monomers, colorants, and free-radical photoinitiators, and non-curable resins (e.g., viscosity modifiers).

The gellant oligomer mixture composition may be present in the curable solid ink in an amount of from about 1% to about 50%, from about 1% to about 30%, from about 2% to about 20%, from about 5% to about 15%, and from about 5% to about 10% by weight of the ink.

A curable wax may be present in the curable solid ink in an amount of from about 0.1 to about 30% of the total weight of the curable solid ink. This includes from about 1% to about 30%, from about 1% to about 20%, and from about 5% to about 10% by weight of the ink.

In specific embodiments, the curable monomers may be present in the curable solid ink in an amount of from about 50 to about 95%, or from about 60 to about 90% by weight of the total weight of the curable solid ink. This includes from about 50% to about 80%, from about from about 60% to about 80%, and from about 80% to about 95% by weight of the ink.

A colorant may be present in the curable solid ink in an amount of from about 0.1% to about 10%, from about 1% to about 10%, from about 5% to about 10%, or from about 1% to about 5% by weight of the total weight of the curable solid ink.

A photoinitiator may be present in the curable solid ink in an amount of from about 0.5% to about 15%, from about 5% to about 15%, from about 1% to about 10%, from about 5% to about 10%, and from about 1% to about 5% by weight of the total weight of the curable solid ink.

The ink compositions can be prepared by any desired or suitable method. For example, each of the components of the ink carrier can be mixed together, followed by heating, the mixture to at least its melting point, for example from about 60° C. to about 110° C., 80° C. to about 100° C. and 85° C. to about 95° C. The colorant may be added before the ink ingredients have been heated or after the ink ingredients have been heated. When pigments are the selected colorants, the molten mixture may be subjected to grinding in an attritor or ball mill apparatus to effect dispersion of the pigment in the ink carrier. The heated mixture is then stirred for about 5 seconds to about 30 minutes or more, to obtain a substantially homogeneous, uniform melt, followed by cooling the ink to ambient temperature (typically from about 20° C. to about 25° C.). The inks are solid at ambient temperature. In a specific embodiment, during the formation process, the inks in their molten state are poured into molds and then allowed to cool and solidify to form ink sticks. Suitable ink preparation techniques are disclosed in U.S. Pat. No. 7,186,762, the disclosure of which is incorporated herein by reference in its entirety.

According to some embodiments, there is provided a curable solid ink comprising a gellant oligomer mixture composition of the present embodiments.

According to some embodiments, there is provided a curable solid ink comprising a curable wax; one or more monomers; an optional colorant; gellant oligomer mixture composition of the present embodiments; and a photoinitiator.

In some embodiments, the ink compositions comprise at least one curable wax, at least one monomer and at least one gellant oligomer mixture composition of the present embodiments. The ink compositions may optionally comprise one or more of the following: a non-curable component; a colorant; and a photoinitiator.

According to some embodiments, there is provided a curable solid ink comprising a curable wax; an optional non-curable component; one or more monomers; an optional colorant; a gellant oligomer mixture composition of the present embodiments; and a photoinitiator.

In some embodiments, the ink compositions of the present embodiments may be liquid curable inks. In some embodiments, the ink compositions of the present embodiments may further comprise additional gellants, which includes both curable and non-curable gellants.

Curable Waxes

The inks of the present embodiments may comprise blends of curable waxes, monomers, a gellant oligomer mixture composition of the present embodiments, optional colorants, and free-radical photoinitiators, and optionally up to 5% by weight of non-curable resins, such as viscosity modifiers. The curable waxes, monomers, curable waxes, optional colorants, and free-radical photoinitiators are solid materials below about 40° C., or from below about 40 to below about 30° C., with little or no smell. These components were selected to achieve jetting at temperatures in the range of from about 70° C. to about 100° C., or from about 80° C. to about 100° C., or from about 70° C. to about 90° C. These solid inks thus have robust jetting at elevated temperatures with a viscosity of from about 5 to about 15 cPs, or from about 10 to about 15 cPs, or from about 8 to about 12 cPs at these temperatures, and are solid at room temperature which prevents excessive spreading or migration of the printed droplet on porous substrate. After printing, the compositions are cured to provide robust images.

The curable solid components include monomers, curable waxes and a gellant oligomer mixture composition of the present embodiments. The curable wax may be a solid at room temperature (25° C.). Inclusion of the wax may promote an increase in viscosity of the ink composition as the composition cools from the application temperature. The curable wax may be any wax component that is miscible with the other components and that will polymerize to form a polymer. The term wax includes, for example, any of the various natural, modified natural, and synthetic materials commonly referred to as waxes.

Suitable examples of curable waxes include waxes that include or are functionalized with curable groups. The curable groups may include, for example, an acrylate, methacrylate, alkene, allylic ether, epoxide, oxetane, and the like. These waxes can be synthesized by the reaction of a wax, such as a polyethylene wax equipped with a carboxylic acid or hydroxyl transformable functional group.

Suitable examples of hydroxyl-terminated polyethylene waxes that may be functionalized with a curable group include mixtures of carbon chains with the structure $CH_3$—$(CH_2)_n$—$CH_2OH$, where there is a mixture of chain lengths, n, where the average chain length can be in the range of about 16 to about 50, and linear low molecular weight polyethylene, of similar average chain length. Suitable examples of such waxes include, but are not limited to, the UNILIN series of materials such as UNILIN 350, UNILIN 425, UNILIN 550 and UNILIN 700 with $M_n$ approximately equal to 375, 460, 550 and 700 g/mol, respectively. All of these waxes are commercially available from Baker-Petrolite. Guerbet alcohols, characterized as 2,2-dialkyl-1-ethanols, are also suitable compounds. Exemplary Guerbet alcohols include those containing about 16 to about 36 carbons, many of which are commercially available from Jarchem Industries Inc., Newark, N.J. PRIPOL® 2033 (C-36 dimer diol mixture including isomers of the formula

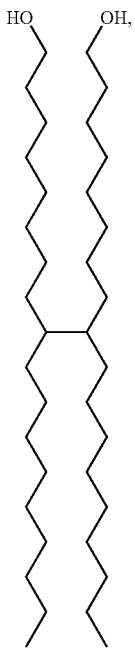 [SMILES: CCCCCCCCCC(CCCCCCCCO)C(CCCCCCCCC)CCCCCCCCO]

as well as other branched isomers that may include unsaturations and cyclic groups, available from Uniqema, New Castle, Del.; further information on $C_{36}$ dimer diols of this type is disclosed in, for example, "Dimer Acids," *Kirk-Othmer Encyclopedia of Chemical Technology*, Vol. 8, 4$^{th}$ Ed. (1992), pp. 223-237, the disclosure of which is totally incorporated herein by reference, may also be used. These alcohols can be reacted with carboxylic acids equipped with UV curable moieties to form reactive esters. Examples of these acids include acrylic and methacrylic acids, available from Sigma-Aldrich Co.

Suitable examples of carboxylic acid-terminated polyethylene waxes that may be functionalized with a curable group include mixtures of carbon chains with the structure $CH_3-(CH_2)_n-COON$, where there is a mixture of chain lengths, n, where the average chain length is about 16 to about 50, and linear low molecular weight polyethylene, of similar average chain length. Suitable examples of such waxes include UNICID® 350, UNICID® 425, UNICID® 550 and UNICID® 700 with $M_n$ equal to approximately 390, 475, 565 and 720 g/mol, respectively. Other suitable waxes have a structure $CH_3-(CH_2)_n-COOH$, such as hexadecanoic or palmitic acid with n=14, heptadecanoic or margaric or daturic acid with n=15, octadecanoic or stearic acid with n=16, eicosanoic or arachidic acid with n=18, docosanoic or behenic acid with n=20, tetracosanoic or lignoceric acid with n=22, hexacosanoic or cerotic acid with n=24, heptacosanoic or carboceric acid with n=25, octacosanoic or montanic acid with n=26, triacontanoic or melissic acid with n=28, dotriacontanoic or lacceroic acid with n=30, tritriacontanoic or ceromelissic or psyllic acid, with n=31, tetratriacontanoic or geddic acid with n=32, pentatriacontanoic or ceroplastic acid with n=33. Guerbet acids, characterized as 2,2-dialkyl ethanoic acids, are also suitable compounds. Exemplary Guerbet acids include those containing 16 to 36 carbons, many of which are commercially available from Jarchem Industries Inc., Newark, N.J. PRIPOL® 1009 (C-36 dimer acid mixture including isomers of the formula

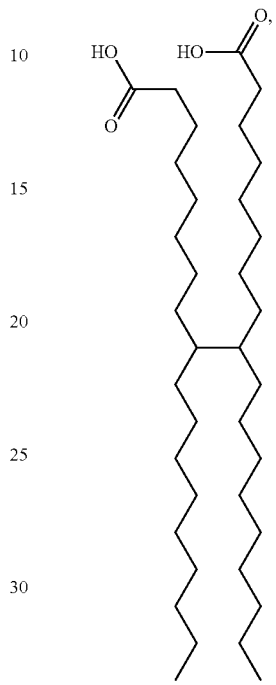

as well as other branched isomers that may include unsaturations and cyclic groups, available from Uniqema, New Castle, Del.; further information on $C_{36}$ dimer acids of this type is disclosed in, for example, "Dimer Acids," *Kirk-Othmer Encyclopedia of Chemical Technology*, Vol. 8, 4$^{th}$ Ed. (1992), pp. 223-237, the disclosure of which is totally incorporated herein by reference, can also be used. These carboxylic acids can be reacted with alcohols equipped with UV curable moieties to form reactive esters. Examples of these alcohols include, but are not limited to, 2-allyloxyethanol from Sigma-Aldrich Co.;

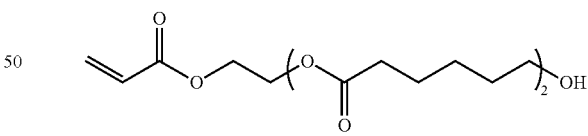

SR495B from Sartomer Company, Inc. (Exton, Pa.); and

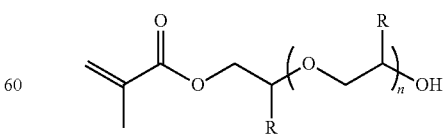

CD572 (R=H, n=10) and SR604 (R=Me, n=4) from Sartomer Company, Inc.

The curable wax can be included in the composition in an amount of from, for example, about 0.1% to about 30% by weight of the composition, such as from about 0.5% to about 20% or from about 0.5% to 15% by weight of the composition.

Monomers

In some embodiments, the ink compositions may further optionally comprise monomers. The monomers that may be used in the present embodiments are, in embodiments, those described in U.S. Pat. No. 7,559,639, which is hereby incorporated by reference. For example, the monomer may be a dimethanol diacrylate cyclohexane difunctional monomer, such as for example, CD-406 from Sartomer (mp=78° C.); an isocyanurate triacrylate trifunctional monomer, such as for example, SR-368 from Sartomer (mp=50-55° C.); a behenyl acrylate monofunctional monomer C18,C20,C22 mixture, such as for example, CD587 from Sartomer (mp=55° C.); an acrylate curable monofunctional acrylate wax C22,C23,C24 mixture, such as for example, UNILIN 350 from Baker Petrolite (Houston, Tex.) (mp=78-83° C.); and a a gellant oligomer mixture composition of the present embodiments.

In some embodiments, the monomer is a curable monomer. Thus, ink of the present embodiments may comprise a gellant oligomer mixture composition of the present embodiments, at least one curable wax, at least a curable monomer, an optional photoinitiator, and an optional colorant. In embodiments, if more than one curable liquid monomer is present in the curable phase change ink, the curable liquid monomers are referred to "co-monomers". The co-monomers may be chosen from any suitable curable monomers.

Ink compositions of embodiments may comprise a first co-monomer, due to the solubility and gelling properties of gellant materials, such as, epoxy-polyamide composite gellants, which are useful for producing ink compositions including an ink vehicle having a thermally-driven and reversible gel phase, where the ink vehicle is comprised of curable liquid monomers, such as UV-curable liquid monomers. The gel phase of such ink compositions allows an ink droplet to be pinned to a receiving substrate.

Examples of the at least one curable monomer of the composition include propoxylated neopentyl glycol diacrylate (such as SR9003 from Sartomer), diethylene glycol diacrylate, triethylene glycol diacrylate, butanediol diacrylate, hexanediol diacrylate, dipropyleneglycol diacrylate, tripropylene glycol diacrylate, alkoxylated neopentyl glycol diacrylate, isodecyl acrylate, tridecyl acrylate, isobornyl acrylate, isobornyl (meth)acrylate, propoxylated trimethylolpropane triacrylate, ethoxylated trimethylolpropane triacrylate, di-trimethylolpropane tetraacrylate, dipentaerythritol pentaacrylate, ethoxylated pentaerythritol tetraacrylate, propoxylated glycerol triacrylate, isobornyl methacrylate, lauryl acrylate, lauryl methacrylate, neopentyl glycol propoxylate methylether monoacrylate, isodecylmethacrylate, caprolactone acrylate, 2-phenoxyethyl acrylate, isooctylacrylate, isooctylmethacrylate, tricyclodecane dimethanol diacrylate, dioxane glycol diacrylate, mixtures thereof and the like. As relatively non-polar monomers, mention may be made of isodecyl(meth)acrylate, caprolactone acrylate, 2-phenoxyethyl acrylate, isooctyl(meth)acrylate, and butyl acrylate. In addition, multifunctional acrylate monomers/oligomers may be used not only as reactive diluents, but also as materials that can increase the cross-link density of the cured image, thereby enhancing the toughness of the cured images.

The term "curable monomer" is also intended to encompass curable oligomers, which may also be used in the composition. Examples of suitable curable oligomers that may be used in the compositions have a low viscosity, for example, from about 50 cPs to about 10,000 cPs, such as from about 75 cPs to about 7,500 cPs or from about 100 cPs to about 5,000 cPs. Examples of such oligomers may include CN549, CN131, CN131B, CN2285, CN 3100, CN3105, CN132, CN133, CN 132, available from Sartomer Company, Inc., Exeter, Pa., Ebecryl 140, Ebecryl 1140, Ebecryl 40, Ebecryl 3200, Ebecryl 3201, Ebecryl 3212, available from Cytec Industries Inc, Smyrna Ga., PHOTOMER 3660, PHOTOMER 5006F, PHOTOMER 5429, PHOTOMER 5429F, available from Cognis Corporation, Cincinnati, Ohio, LAROMER PO 33F, LAROMER PO 43F, LAROMER PO 94F, LAROMER UO 35D, LAROMER PA 9039V, LAROMER PO 9026V, LAROMER 8996, LAROMER 8765, LAROMER 8986, available from BASF Corporation, Florham Park, N.J., and the like. As multifunctional acrylates and methacrylates, mention may also be made of pentaerythritol tetra(meth)acrylate, 1,2 ethylene glycol di(meth)acrylate, 1,6 hexanediol di(meth)acrylate, 1,12-dodecanol di(meth)acrylate, tris (2-hydroxy ethyl) isocyanurate triacrylate, propoxylated neopentyl glycol diacrylate, hexanediol diacrylate, tripropylene glycol diacrylate, dipropylene glycol diacrylate, amine-modified polyether acrylates (available as PO 83 F, LR 8869, and/or LR 8889 (all available from BASF Corporation)), trimethylolpropane triacrylate, glycerol propoxylate triacrylate, dipentaerythritol penta-/hexa-acrylate, ethoxylated pentaerythritol tetraacrylate (available from Sartomer Co. Inc. as SR399LV and SR 494), and the like.

Additional examples of the curable monomers include acrylated esters, acrylated polyesters, acrylated ethers, acrylated polyethers, acrylated epoxies, urethane acrylates, and pentaerythritol tetraacrylate. Specific examples of suitable acrylated oligomers include, acrylated polyester oligomers, such as CN2262 (Sartomer Co.), EB 812 (Cytec Surface Specialties), EB 810 (Cytec Surface Specialties), CN2200 (Sartomer Co.), CN2300 (Sartomer Co.), and the like; acrylated urethane oligomers, such as EB270 (UCB Chemicals), EB 5129(Cytec Surface Specialties), CN2920 (Sartomer Co.), CN3211 (Sartomer Co.), and the like; and acrylated epoxy oligomers, such as EB 600 (Cytec Surface Specialties), EB 3411 (Cytec Surface Specialties), CN2204 (Sartomer Co.), CN110 (Sartomer Co.), and the like.

In embodiments, the curable monomer may be chosen from short-chain alkyl glycol diacrylates or ether diacrylates or from acrylates having short-chain alkyl ester substituents, such as caprolactone acrylate, and the commercially available products CD536, CD 2777, CD585 and CD586 (available from Sartomer Co. Inc.).

In addition, the curable monomer or oligomer may variously function as a viscosity reducer, as a binder when the composition is cured, as an adhesion promoter, as a reactive diluent and as a crosslinking agent that can increase the crosslink density of the cured image, thereby enhancing the toughness of the cured images. Suitable monomers may have a low molecular weight, low viscosity, and low surface tension and comprise functional groups that undergo polymerization upon exposure to radiation such as UV light.

Initiator

As mentioned above, the ink compositions may further optionally comprise an initiator, such as, for example, a photoinitiator. Such an initiator is desirable for assisting in curing of the ink. In embodiments, a photoinitiator that absorbs radiation, for example UV light radiation, to initiate curing of the curable components of the ink may be used. As the photoinitiator for ink compositions that are cured by free-radical polymerization, for instance, ink compositions containing acrylate groups or inks comprised of polyamides, mention may be made of photoinitiators such as benzophenones, benzoin ethers, benzil ketals, α-hydroxyalkylphenones, α-alkoxyalkylphenones α-aminoalkylphenones and acylphosphine photoinitiators sold under the trade designations of IRGACURE and DAROCUR from Ciba. Specific examples of suitable photoinitiators include 2,4,6-trimethylbenzoyldiphenylphosphine oxide (available as BASF LUCIRIN TPO); 2,4,6-trimethylbenzoylethoxyphenylphosphine oxide (available as BASF LUCIRIN TPO-L); bis(2,4,6-trimethylbenzoyl)-phenyl-phosphine oxide (available as Ciba IRGACURE 819) and other acyl phosphines; 2-methyl-1-(4-methylthio)phenyl-2-(4-morphorlinyl)-1-propanone (available as Ciba IRGACURE 907) and 1-(4-(2-hydroxyethoxy) phenyl)-2-hydroxy-2-methylpropan-1-one (available as Ciba IRGACURE 2959); 2-benzyl 2-dimethylamino 1-(4-morpholinophenyl) butanone-1 (available as Ciba IRGACURE 369); 2-hydroxy-1-(4-(4-(2-hydroxy-2-methylpropionyl)-benzyl)-phenyl)-2-methylpropan-1-one (available as Ciba IRGACURE 127); 2-dimethylamino-2-(4-methylbenzyl)-1-(4-morpholin-4-ylphenyl)-butanone (available as Ciba IRGACURE 379); titanocenes; isopropylthioxanthone; 1-hydroxy-cyclohexylphenylketone; benzophenone; 2,4,6-trimethylbenzophenone; 4-methylbenzophenone; diphenyl-(2,4, 6-trimethylbenzoyl) phosphine oxide; 2,4,6-trimethylbenzoylphenylphosphinic acid ethyl ester; oligo(2-hydroxy-2-methyl-1-(4-(1-methylvinyl)phenyl) propanone); 2-hydroxy-2-methyl-1-phenyl-1-propanone; benzyl-dimethylketal; and mixtures thereof. Mention may also be made of amine synergists, which are described as co-initiators that donate a hydrogen atom to a photoinitiator and thereby form a radical species that initiates polymerization (amine synergists can also consume oxygen dissolved in the ink—as oxygen inhibits free-radical polymerization its consumption increases the speed of polymerization), for example such as ethyl-4-dimethylaminobenzoate and 2-ethylhexyl-4-dimethylaminobenzoate. This list is not exhaustive, and any known photoinitiator that initiates the free-radical reaction upon exposure to a desired wavelength of radiation such as UV light can be used without limitation.

The photoinitiator may absorb radiation of about 200 to about 420 nm wavelengths in order to initiate cure, although use of initiators that absorb at longer wavelengths, such as the titanocenes that may absorb up to 560 nm, can also be used without restriction.

The total amount of initiator included in the ink composition may be from, for example, about 0.5 to about 15% by weight, such as from about 1 to about 10% by weight, of the ink composition.

Radiation curable phase change inks generally comprise at least one curable monomer, a gellator, a colorant, and a radiation activated initiator, specifically a photoinitiator, that initiates polymerization of curable components of the ink, specifically of the curable monomer. U.S. Pat. No. 7,279,587 to Odell et al., the disclosure of which is totally incorporated herein by reference, discloses photoinitiating compounds useful in curable solid ink compositions. U.S. Patent Publication 2007/0120910 to Odell et al., which is hereby incorporated by reference herein in its entirety, describes, in embodiments, a solid ink comprising a colorant, an initiator, and an ink vehicle.

Optionally, the ink compositions can also contain an amine synergist, which are co-initiators which can donate a hydrogen atom to a photoinitiator and thereby form a radical species that initiates polymerization, and can also consume dissolved oxygen, which inhibits free-radical polymerization, thereby increasing the speed of polymerization. Examples of suitable amine synergists include (but are not limited to) ethyl-4-dimethylaminobenzoate, 2-ethylhexyl-4-dimethylaminobenzoate, and the like, as well as mixtures thereof.

Initiators for inks disclosed herein can absorb radiation at any desired or effective wavelength, for example, from about 4 nanometers to about 560 nanometers, or from about 200 nanometers to about 560 nanometers, or from about 200 nanometers to about 420 nanometers, although the wavelength can be outside of these ranges.

Optionally, the photoinitiator is present in the phase change ink in any desired or effective amount, for example from about 0.5% to about 15% by weight of the ink composition, or from about 1% to about 10% by weight of the ink composition, although the amount can be outside of these ranges.

Colorant

In some embodiments, the ink compositions may further optionally comprise colorant. Any desired or effective colorant can be employed in the ink compositions, including dyes, pigments, mixtures thereof, and the like, provided that the colorant can be dissolved or dispersed in the ink vehicle and is compatible with the other ink components. Pigments, which are typically cheaper and more robust than dyes, may be included in the curable phase change ink composition. The color of many dyes can be altered by the polymerization process occurring during the curing stage, presumably from attack of their molecular structure by the free radicals. The compositions can be used in combination with conventional ink-colorant materials, such as Color Index (C.I.) Solvent Dyes, Disperse Dyes, modified Acid and Direct Dyes, Basic Dyes, Sulphur Dyes, Vat Dyes, and the like.

Examples of suitable dyes include Neozapon Red 492 (BASF); Orasol Red G (Ciba); Direct Brilliant Pink B (Oriental Giant Dyes); Direct Red 3BL (Classic Dyestuffs); Supranol Brilliant Red 3BW (Bayer AG); Lemon Yellow 6G (United Chemie); Light Fast Yellow 3G (Shaanxi); Aizen Spilon Yellow C-GNH (Hodogaya Chemical); Bernachrome Yellow GD Sub (Classic Dyestuffs); Cartasol Brilliant Yellow 4GF (Clariant); Cibanon Yellow 2GN (Ciba); Orasol Black CN (Ciba); Savinyl Black RLSN(Clariant); Pyrazol Black BG (Clariant); Morfast Black 101 (Rohm & Haas); Diaazol Black RN (ICI); Orasol Blue GN (Ciba); Savinyl Blue GLS (Clariant); Luxol Fast Blue MBSN (Pylam Products); Sevron Blue 5GMF (Classic Dyestuffs); Basacid Blue 750 (BASF), Neozapon Black X51 (BASF), Classic Solvent Black 7 (Classic Dyestuffs), Sudan Blue 670 (C.I. 61554) (BASF), Sudan Yellow 146 (C.I. 12700) (BASF), Sudan Red 462 (C.I. 26050) (BASF), C.I. Disperse Yellow 238, Neptune Red Base NB543 (BASF, C.I. Solvent Red 49), Neopen Blue FF-4012 from BASF, Lampronol Black BR from ICI (C.I. Solvent Black 35), Morton Morplas Magenta 36 (C.I. Solvent Red 172), metal phthalocyanine colorants such as those disclosed in U.S. Pat. No. 6,221,137, the disclosure of which is totally incorporated herein by reference, and the like. Polymeric dyes can also be used, such as those disclosed in, for example, U.S. Pat. Nos. 5,621,022 and 5,231,135, the disclosures of each of which are herein entirely incorporated herein by reference, and commercially available from, for example, Milliken & Company as Milliken Ink Yellow 869, Milliken Ink Blue 92, Milliken Ink Red 357, Milliken Ink Yellow 1800, Milliken Ink Black 8915-67, uncut Reactant Orange X-38, uncut Reactant Blue X-17, Solvent Yellow 162, Acid Red 52, Solvent Blue 44, and uncut Reactant Violet X-80.

Pigments are also suitable colorants for the curable phase change inks. Examples of suitable pigments include PALIOGEN Violet 5100 (commercially available from BASF); PALIOGEN Violet 5890 (commercially available from BASF); HELIOGEN Green L8730 (commercially available from BASF); LITHOL Scarlet D3700 (commercially available from BASF); SUNFAST Blue 15:4 (commercially available from Sun Chemical); Hostaperm Blue B2G-D (commercially available from Clariant); Hostaperm Blue B4G (commercially available from Clariant); Permanent Red P-F7RK; Hostaperm Violet BL (commercially available from Clariant); LITHOL Scarlet 4440 (commercially available from BASF); Bon Red C (commercially available from Dominion Color Company); ORACET Pink RF (commercially available from Ciba); PALIOGEN Red 3871 K (commercially available from BASF); SUNFAST Blue 15:3 (commercially available from Sun Chemical); PALIOGEN Red 3340 (commercially available from BASF); SUNFAST Carbazole Violet 23 (commercially available from Sun Chemical); LITHOL Fast Scarlet L4300 (commercially available from BASF); SUNBRITE Yellow 17 (commercially available from Sun Chemical); HELIOGEN Blue L6900, L7020 (commercially available from BASF); SUNBRITE Yellow 74 (commercially available from Sun Chemical); SPECTRA PAC C Orange 16 (commercially available from Sun Chemical); HELIOGEN Blue K6902, K6910 (commercially available from BASF); SUNFAST Magenta 122 (commercially available from Sun Chemical); HELIOGEN Blue D6840, D7080 (commercially available from BASF); Sudan Blue OS (commercially available from BASF); NEOPEN Blue FF4012 (commercially available from BASF); PV Fast Blue B2GO1 (commercially available from Clariant); IRGALITE Blue BCA (commercially available from Ciba); PALIOGEN Blue 6470 (commercially available from BASF); Sudan Orange G (commercially available from Aldrich), Sudan Orange 220 (commercially available from BASF); PALIOGEN Orange 3040 (BASF); PALIOGEN Yellow 152, 1560 (commercially available from BASF); LITHOL Fast Yellow 0991 K (commercially available from BASF); PALIOTOL Yellow 1840 (commercially available from BASF); NOVOPERM Yellow FGL (commercially available from Clariant); Ink Jet Yellow 4G VP2532 (commercially available from Clariant); Toner Yellow HG (commercially available from Clariant); Lumogen Yellow D0790 (commercially available from BASF); Suco-Yellow L1250 (commercially available from BASF); Suco-Yellow D1355 (commercially available from BASF); Suco Fast Yellow D1355, D1351 (commercially available from BASF); HOSTAPERM Pink E 02 (commercially available from Clariant); Hansa Brilliant Yellow 5GX03 (commercially available from Clariant); Permanent Yellow GRL 02 (commercially available from Clariant); Permanent Rubine L6B 05 (commercially available from Clariant); FANAL Pink D4830 (commercially available from BASF); CINQUASIA Magenta (commercially available from DU PONT); PALIOGEN Black L0084 (commercially available from BASF); Pigment Black K801 (commercially available from BASF); and carbon blacks such as REGAL 330™ (commercially available from Cabot), Nipex 150 (commercially available from Degusssa) Carbon Black 5250 and Carbon Black 5750 (commercially available from Columbia Chemical), and the like, as well as mixtures thereof.

In embodiments, solvent dyes are employed. An example of a solvent dye suitable for use herein may include spirit soluble dyes because of their compatibility with the ink carriers disclosed herein. Examples of suitable spirit solvent dyes include Neozapon Red 492 (BASF); Orasol Red G (Ciba); Direct Brilliant Pink B (Global Colors); Aizen Spilon Red C-BH (Hodogaya Chemical); Kayanol Red 3BL (Nippon Kayaku); Spirit Fast Yellow 3G; Aizen Spilon Yellow C-GNH (Hodogaya Chemical); Cartasol Brilliant Yellow 4GF (Clariant); Pergasol Yellow CGP (Ciba); Orasol Black RLP (Ciba); Savinyl Black RLS (Clariant); Morfast Black Conc. A (Rohm and Haas); Orasol Blue GN (Ciba); Savinyl Blue GLS (Sandoz); Luxol Fast Blue MBSN (Pylam); Sevron Blue 5GMF (Classic Dyestuffs); Basacid Blue 750 (BASF), Neozapon Black X51 [C.I. Solvent Black, C.I. 12195] (BASF), Sudan Blue 670 [C.I. 61554] (BASF), Sudan Yellow 146 [C.I. 12700] (BASF), Sudan Red 462 [C.I. 260501] (BASF), mixtures thereof and the like.

The colorant may be present in the ink in any desired or effective amount to obtain the desired color or hue such as, for example, at least from about 0.1% by weight of the ink to about 50% by weight of the ink, or from at least from about 0.2% by weight of the ink to about 20% by weight of the ink, or at least from about 0.5% by weight of the ink to about 10% by weight of the ink.

Ink Vehicle Or Carrier

In specific embodiments, the ink vehicles disclosed herein can comprise any suitable curable monomer or prepolymer. The curable monomer or prepolymer and curable wax together can form more than about 50%, or at least 70%, or at least 80% by weight of the ink. Examples of suitable materials include radically curable monomer compounds, such as acrylate and methacrylate monomer compounds, which are suitable for use as phase change ink carriers. Specific examples of relatively nonpolar acrylate and methacrylate monomers include (but are not limited to) isobornyl acrylate, isobornyl methacrylate, lauryl acrylate, lauryl methacrylate, isodecylacrylate, isodecylmethacrylate, caprolactone acrylate, 2-phenoxyethyl acrylate, isooctylacrylate, isooctylmethacrylate, butyl acrylate, and the like, as well as mixtures and combinations thereof. In addition, multifunctional acrylate and methacrylate monomers and oligomers can be included in the phase change ink carrier as reactive diluents and as materials that can increase the crosslink density of the cured image, thereby enhancing the toughness of the cured images. Examples of suitable multifunctional acrylate and methacrylate monomers and oligomers include (but are not limited to) pentaerythritol tetraacrylate, pentaerythritol tetramethacrylate, 1,2-ethylene glycol diacrylate, 1,2-ethylene glycol dimethacrylate, 1,6-hexanediol diacrylate, 1,6-hexanediol dimethacrylate, 1,12-dodecanol diacrylate, 1,12-dodecanol dimethacrylate, tris(2-hydroxy ethyl) isocyanurate triacrylate, propoxylated neopentyl glycol diacrylate (available from Sartomer Co. Inc. as SR 9003), hexanediol diacrylate, tripropylene glycol diacrylate, dipropylene glycol diacrylate, amine modified polyether acrylates (available as PO 83 F, LR 8869, and/or LR 8889 (all available from BASF Corporation), trimethylolpropane triacrylate, glycerol propoxylate triacrylate, dipentaerythritol pentaacrylate, dipentaerythritol hexaacrylate, ethoxylated pentaerythritol tetraacrylate (available from Sartomer Co. Inc. as SR 494), and the like, as well as mixtures and combinations thereof. When a reactive diluent is added to the ink carrier material, the reactive diluent is added in any desired or effective amount, for example, from about 1% to about 80% by weight of the carrier, or from about 35% to about 70% by weight of the carrier, although the amount of diluent can be outside of these ranges.

In specific embodiments, the ink vehicles disclosed herein can comprise any suitable photoinitiator. Examples of specific initiators include, but are not limited to, IRGACURE® 127, IRGACURE® 379, and IRGACURE® 819, all commercially available from Ciba Specialty Chemicals, among others. Further examples of suitable initiators include (but are not limited to) benzophenones, benzophenone derivatives, benzyl ketones, α-alkoxy benzyl ketones, monomeric hydroxyl ketones, polymeric hydroxyl ketones, α-amino ketones, alkoxy ketones, acyl phosphine oxides, metallocenes, benzoin ethers, benzil ketals, α-hydroxyalkylphenones, α-aminoalkylphenones, acylphosphine photoinitiators sold under the trade designations of IRGACURE® and DAROCUR® from Ciba, and the like. Specific examples include 1-hydroxy-cyclohexylphenylketone, benzophenone, 2-benzyl-2-(dimethylamino)-1-(4-(4-morphorlinyl)phenyl)-1-butanone, 2-methyl-1-(4-methylthio)phenyl-2-(4-morphorlinyl)-1-propanone, diphenyl-(2,4,6-trimethylbenzoyl) phosphine oxide, phenyl bis(2,4,6-trimethylbenzoyl) phosphine oxide, benzyl-dimethylketal, isopropylthioxanthone, 2,4,6-trimethylbenzoyldiphenylphosphine oxide (available as BASF LUCIRIN® TPO), 2,4,6-trimethylbenzoylethoxyphenylphosphine oxide (available as BASF LUCIRIN® TPO-L), bis(2,4,6-trimethylbenzoyl)-phenyl-phosphine oxide (available as Ciba IRGACURE® 819) and other acyl phosphines, 2-methyl-1-(4-methylthio)phenyl-2-(4-morphorlinyl)-1-propane (available as Ciba IRGACURE® 907) and 1-(4-(2-hydroxyethoxy)phenyl)-2-hydroxy-2-methylpropan-1-one (available as Ciba IRGACURE® 2959), 2-benzyl 2-dimethylamino-1-(4-morpholinophenyl) butanone-1 (available as Ciba IRGACURE® 369), 2-hydroxy-1-(4-(4-(2-hydroxy-2-methylpropionyl)-benzyl)-phenyl-2-methylpropan-1-one (available as Ciba IRGACURE® 127), 2-dimethylamino-2-(4-methylbenzyl)-1-(4-morpholin-4-ylphenyl)-butanone (available as Ciba IRGACURE® 379), titanocenes, isopropylthioxanthone, 1-hydroxy-cyclohexylphenylketone, benzophenone, 2,4,6-trimethylbenzophenone, 4-methylbenzophenone, diphenyl-(2,4,6-trimethylbenzoyl) phosphine oxide, 2,4,6-trimethylbenzoylphenylphosphinic acid ethyl ester, oligo(2-hydroxy-2-methyl-1-(4-(1-methylvinyl)phenyl) propanone), 2-hydroxy-2-methyl-1-phenyl-1-propanone, benzyl-dimethylketal, arylsulphonium slats, aryl iodonium salt, and the like, as well as mixtures thereof.

Methods of Use

According to some embodiments, methods are provided for using the curable solid ink for jet printing text. In such embodiments, the method comprises jetting a curable solid ink onto an intermediate substrate to form an intermediate image, transferring the intermediate image onto a substrate to form a transferred image, and exposing the transferred image to radiation having wavelengths in the range of from about 180 nanometers to about 500 nanometers to cure the curable solid ink. In embodiments, the jetting step is performed at above 70° C., or at from about 70 to about 100° C.

Any suitable printing device may used herein. In one embodiment, the apparatus is an ink jet printing device as described in commonly assigned, co-pending U.S. Patent Publication No. 2008/0218540, incorporated by reference in its entirety, that includes at least an ink jet print head and a print region surface toward which ink is jetted from the ink jet print head, wherein a height distance between the ink jet print head and the print region surface is adjustable.

The apparatus, as well as the methods herein, may be employed with any desired printing system and marking material suitable for applying a marking material in an imagewise pattern to an intermediate transfer member or directly to an image receiving substrate, piezoelectric ink jet printing (both with inks liquid at room temperature and with phase change inks), acoustic ink jet printing (both with inks liquid at room temperature and with phase change inks), thermal transfer printing, gravure printing, and the like. For the purpose of illustration, a piezoelectric phase change ink jet printer for applying marking material in an imagewise pattern to an intermediate transfer member is described.

The inks can be employed in apparatus for direct printing ink jet processes and in indirect (offset) printing ink jet applications. Another embodiment disclosed herein is directed to a process which comprises incorporating an ink as disclosed herein into an ink jet printing apparatus, melting the ink, and causing droplets of the melted ink to be ejected in an imagewise pattern onto a recording substrate. A direct printing process is also disclosed in, for example, U.S. Pat. No. 5,195,430, the disclosure of which is totally incorporated herein by reference. Yet another embodiment disclosed herein is directed to a process which comprises incorporating an ink as disclosed herein into an ink jet printing apparatus, melting the ink, causing droplets of the melted ink to be ejected in an imagewise pattern onto an intermediate transfer member, and transferring the ink in the imagewise pattern from the intermediate transfer member to a final recording substrate. In a specific embodiment, the intermediate transfer member is heated to a temperature above that of the final recording sheet and below that of the melted ink in the printing apparatus. In another specific embodiment, both the intermediate transfer member and the final recording sheet are heated; in this embodiment, both the intermediate transfer member and the final recording sheet are heated to a temperature below that of the melted ink in the printing apparatus; in this embodiment, the relative temperatures of the intermediate transfer member and the final recording sheet can be (1) the intermediate transfer member is heated to a temperature above that of the final recording substrate and below that of the melted ink in the printing apparatus; (2) the final recording substrate is heated to a temperature above that of the intermediate transfer member and below that of the melted ink in the printing apparatus; or (3) the intermediate transfer member and the final recording sheet are heated to approximately the same temperature. In one specific embodiment, the printing apparatus employs a piezoelectric printing process wherein droplets of the ink are caused to be ejected in imagewise pattern by oscillations of piezoelectric vibrating elements. Inks as disclosed herein can also be employed in other hot melt printing processes, such as hot melt acoustic ink jet printing, hot melt continuous stream or deflection ink jet printing, and the like. Phase change inks as disclosed herein can also be used in printing processes other than hot melt ink jet printing processes.

Any suitable substrate or recording sheet can be employed, including plain papers such as XEROX 4200 papers, XEROX Image Series papers, Courtland 4024 DP paper, ruled notebook paper, bond paper, silica coated papers such as Sharp Company silica coated paper, JuJo paper, HAMMERMILL LASERPRINT paper, and the like, glossy coated papers such as XEROX Digital Color Gloss, Sappi Warren Papers LUSTROGLOSS, specialty papers such as Xerox DURAPAPER, and the like, transparency materials, fabrics, textile products, plastics, polymeric films, inorganic recording mediums such as metals and wood, and the like, transparency materials, fabrics, textile products, plastics, polymeric films, inorganic substrates such as metals and wood, and the like.

According to some embodiments, there is provided a method of jet printing an image, comprising: jetting a curable solid ink onto a print substrate to form an image; and exposing the image to radiation to cure the curable solid ink on to the print substrate, wherein the curable solid ink comprises a curable wax, an optional non-curable component, one or more monomers, an optional colorant, a gellant oligomer mixture composition of the present embodiments, and a photoinitiator.

Properties of the Gallants and Inks

In some embodiments, the prepared solid inks of the present embodiments have low jetting temperatures than previously achieved, for example, jetting temperatures of from about 100 to about 70° C., or from about 100° C. to about 80° C., from about 90° C. to about 70° C. In particular, the present embodiments also provide faster phase change characteristics, excellent curing performance, increased hardness after curing, and low shrinkage characteristics.

The optimal gel point is dependent on the substrate, as heat dissipations vary. The optimal gel point ranges of the inks according to some embodiments is between ambient room temperature and 70° C., or more preferably between 30° C. and 60° C., or more preferably between 40° C. and 50° C., although the gel point can be outside of these ranges. The gel point is defined as the point in a temperature-step dynamic viscosity measurement where tan delta (or tan δ) is equal to 1. Tan δ is a unitless computed value defined by the following equation:

$$\text{Tan } \delta = G''/G'$$

where G" is the viscous or loss modulus (in Pa) and G' is the storage or elastic modulus (in Pa).

Furthermore, when the tan δ ratio is <1, G" (loss modulus) is less than G' (storage modulus) and the material is defined as a gel. Conversely, when the tan δ ratio is >1, G" (loss modulus) is greater than G' (storage modulus) and the material is no longer a gel.

In some embodiments, the prepared solid inks of the present embodiments have a viscosity of from about 4 mPa·s to about 50 mPa·s at a first temperature from about 70° C. to about 110° C. and having a viscosity of from $10^4$ mPa·s to about $10^9$ mPa·s at a second temperature from about 30° C. to about 60° C. The second temperature may be below the first temperature by at least 10° C., but by no more than 50° C. In some embodiments, the prepared solid inks of the present embodiments have a viscosity of from about $5 \times 10^4$ mPa·s to about $10^7$ mPa·s at a second temperature. In some embodiments, the prepared solid inks of the present embodiments have a storage modulus, G', that is higher than its loss modulus, G", at the second temperature.

The inks according to the present embodiments exhibit stable jetting. Stable jetting is a qualitative measurement that refers to the performance of the ink in a piezoelectric printhead. Characteristics of stable jetting include uniformity of drop volumes (i.e. 30 pL), over a range of frequencies, from 24 kHz to 48 kHz, and is manifested in solid lines on the printed page, with little to no jet drop-out which can be seen as dotted lines on the printed page.

The inks according to the present embodiments exhibit controlled showthrough. Controlled showthrough refers to the degree of "haloing" where the liquid components of the ink (monomer, pigment dispersion) pool out and soak into the page, and is relevant only on porous substrates such as paper and cardboard, but not on foils or plastics, which are non-porous. Showthrough measurements are made by using a spectrodensitometer and measurements are made on the printed colour image (front side), and compared to the backside of the printed page. Differential showthrough and optical density measurements were made with an X-Rite 938 spectrodensitometer. Differential showthrough values quoted represent the difference between underside showthrough and one-paper overside showthrough. Typical values of differential showthrough range from 0.01 to 0.15, with preferred levels of showthrough less than 0.10 arbitrary units.

The present embodiments provide low energy ultraviolet (UV) curable pigmented solid inks with high reactivity and minimum shrinkage. These inks of the present embodiments contain a gellant oligomer mixture composition of the present embodiments and are formulated with viscosities in the range of less than 20 cPs at 90° C., or from about 20 to about 5 cPS at 90° C., or from about 15 to about 8 cPs at 90° C., and a shrinkage value of less than 5%, less than 3% or from about 1% to about 3%. As used herein, the shrinkage value indicates the shrinkage of the ink upon cooling from a liquid state. In addition, these inks exhibit a hardness after curing much higher than conventional solid inks, such as those commercially available from Xerox Corporation or Océ North America. Significant improvements in curing rate and bench-marked hardness after curing was also shown for these inks as well as improved compatibility between components upon solidification. Extensive studies demonstrated that the concentration of non-curable resins should be less than 5%, or from about 1 to about 3%, or less than 1% by weight. Curing rates were obtained by plotting the hardness versus duration of exposure to UV light in s/ft (Fusions UV doped mercury D-bulb, 600 W/cm) and applying the following expressions:

$$y = m_1 + m_2 \cdot (1 - \exp(-m_3 \cdot x))$$

$$\text{Initial Hardness} = m_1$$

$$\text{Initial Slope} = m_2 \cdot m_3$$

$$\text{Final Hardness} = m_1 + m_2$$

where the initial slope is taken as the initial curing rate. The inks of the present embodiments display curing rates from about 130 to about 250 ft/s, such as from about 180 to about 250 ft/s or from about 200 to about 250 ft/s. Depending on the type of bulb used in the UV curable lamp, the characteristic output used for curing may be from about 200 nm to about 450 nm.

It will be appreciated that various embodiments of the above-disclosed and other features and functions, or alternatives thereof, may be desirably combined into many other different systems or applications. Also, various presently unforeseen or unanticipated alternatives, modifications, variations or improvements therein may be subsequently made by those skilled in the art, and are also intended to be encompassed by the following claims.

While the description above refers to particular embodiments, it will be understood that many modifications may be made without departing from the spirit thereof. The accompanying claims are intended to cover such modifications as would fall within the true scope and spirit of embodiments herein.

The presently disclosed embodiments are, therefore, to be considered in all respects as illustrative and not restrictive, the scope of embodiments being indicated by the appended claims rather than the foregoing description. All changes that come within the meaning of and range of equivalency of the claims are intended to be embraced therein.

EXAMPLES

The examples set forth herein below and are illustrative of different compositions and conditions that can be used in practicing the present embodiments. All proportions are by weight unless otherwise indicated. It will be apparent, however, that the present embodiments can be practiced with many types of compositions and can have many different uses in accordance with the disclosure above and as pointed out hereinafter.

Example 1

Synthesis of the Amide Gellant Precursor

The synthesis of the amide gellant precursor (organoamide) is shown below in Scheme 1. It is during the preparation of the organoamide that the oligomers are created (end-capping to make the esters in the final gellant does not change the oligomer distribution).

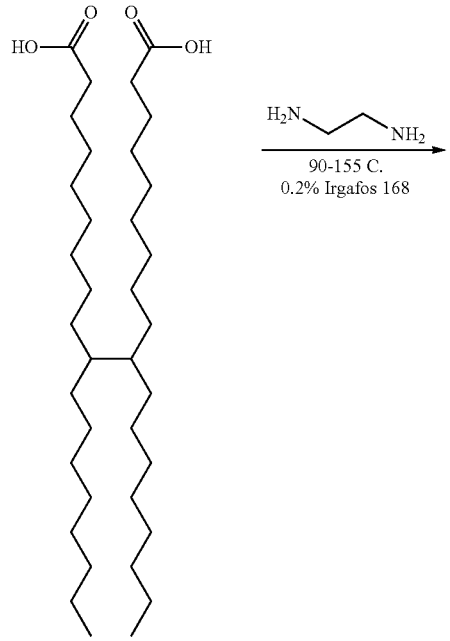

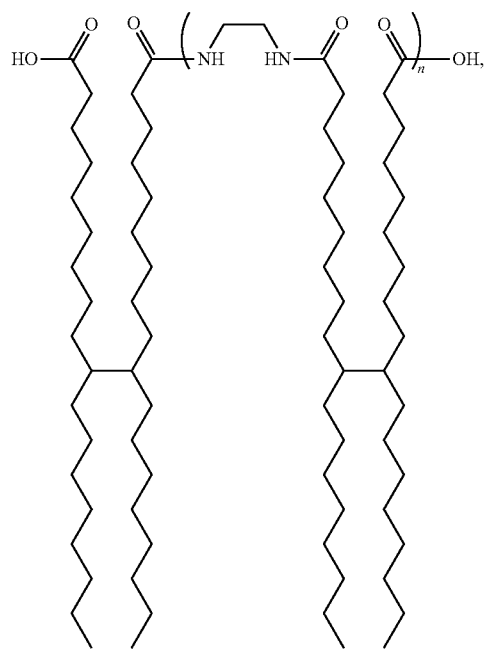

where n may be 0 to about 20, about 0 to about 15, or about 0 to about 10.

By controlling the amount of ethylenediamine (EDA), the distribution can be shifted to create larger proportions of the higher order oligomers. Generally, with higher EDA:Pripol ratios, the higher the gel point and room temperature viscosity of the gellant.

Example 1A

Preparation of the Amide Gellant Precursor (Baseline)

A baseline amide gellant precursor using a EDA:Pripol ratio of 1.125:2 was prepared as follows. To a 2 L stainless steel reactor equipped with baffles and 4-blade impeller was added Pripol 1009 dimer diacid (Cognis Corporation) (703.1 g, acid number=194 mg/g, 1215 mmol). The reactor was purged with argon and heated to 90° C., and the impeller was turned on to 400 RPM. Next, ethylenediamine (Huntsman Chemical Corporation, 21.9 g, 364 mmol) was slowly added through a feed line directly into the reactor over 15 minutes. The reactor temperature was set 95° C. Next, the reactor temperature was ramped up to 165° C. over 280 minutes, and held at 165° C. for 1 hour. Finally, the molten organoamide product was discharged into a foil pan and allowed to cool to room temperature. The product was an amber-coloured solid resin. Acid#: 133.7.

Example 1B

Preparation of the Amide Gellant Precursor (Low Molecular Weight)

A low molecular weight amide gellant precursor using a EDA:Pripol ratio of 0.25:2 was prepared as follows. To a 1 L kettle equipped with PTFE paddle, dropping funnel, Dean-Stark trap, reflux condenser and thermocouple probe was added Pripol 1009 (dimer diacid, Cognis Corporation) (454.27 g, acid number=194 mg/g, 785 mmol). The kettle was purged with argon and heated to 90° C. with stirring. Next, ethylenediamine (Huntsman Chemical Corporation, 6.55 ml, 98 mmol) was added to the dropping funnel and slowly added to the Pripol dropwise over 5-10 minutes. The kettle was gradually heated up 150° C., and finally to 180° C., and held for 4-5 hours. After the reaction was completed, the molten organoamide product was discharged into a foil pan and allowed to cool to room temperature The product was an amber-colored viscous gum. Acid#: 168.72.

Example 1C

Preparation of the Amide Gellant Precursor (High Molecular Weight)

A high molecular weight amide gellant precursor using a EDA:Pripol ratio of 1.5:2 was prepared as follows. To a 1 L kettle equipped with PTFE paddle, dropping funnel, Dean-Stark trap, reflux condenser and thermocouple probe was added Pripol 1009 (dimer diacid, Cognis Corporation) (499.81 g, acid number=194 mg/g, 864 mmol). The kettle was purged with argon and heated to 90° C. with stirring. Next, ethylenediamine (Huntsman Chemical Corporation, 43.3 ml, 648 mmol) was added to the dropping funnel and slowly added to the Pripol dropwise over 5-10 min's. The kettle was gradually heated up 150° C., and finally to 180° C., and held for 4-5 h. After the reaction was completed, the molten organoamide product was discharged into a foil pan and allowed to cool to room temperature The product was an amber-colored solid. Acid#: 55.57.

Example 2

Preparation of the Amide Gellant

The synthesis of an amide gellant is shown below in Scheme 2. It involves an end-capping of the acid termini of the oligomers with phenyl glycol. Gellants of Examples 2A, 2B and 2C are all described by the following Scheme.

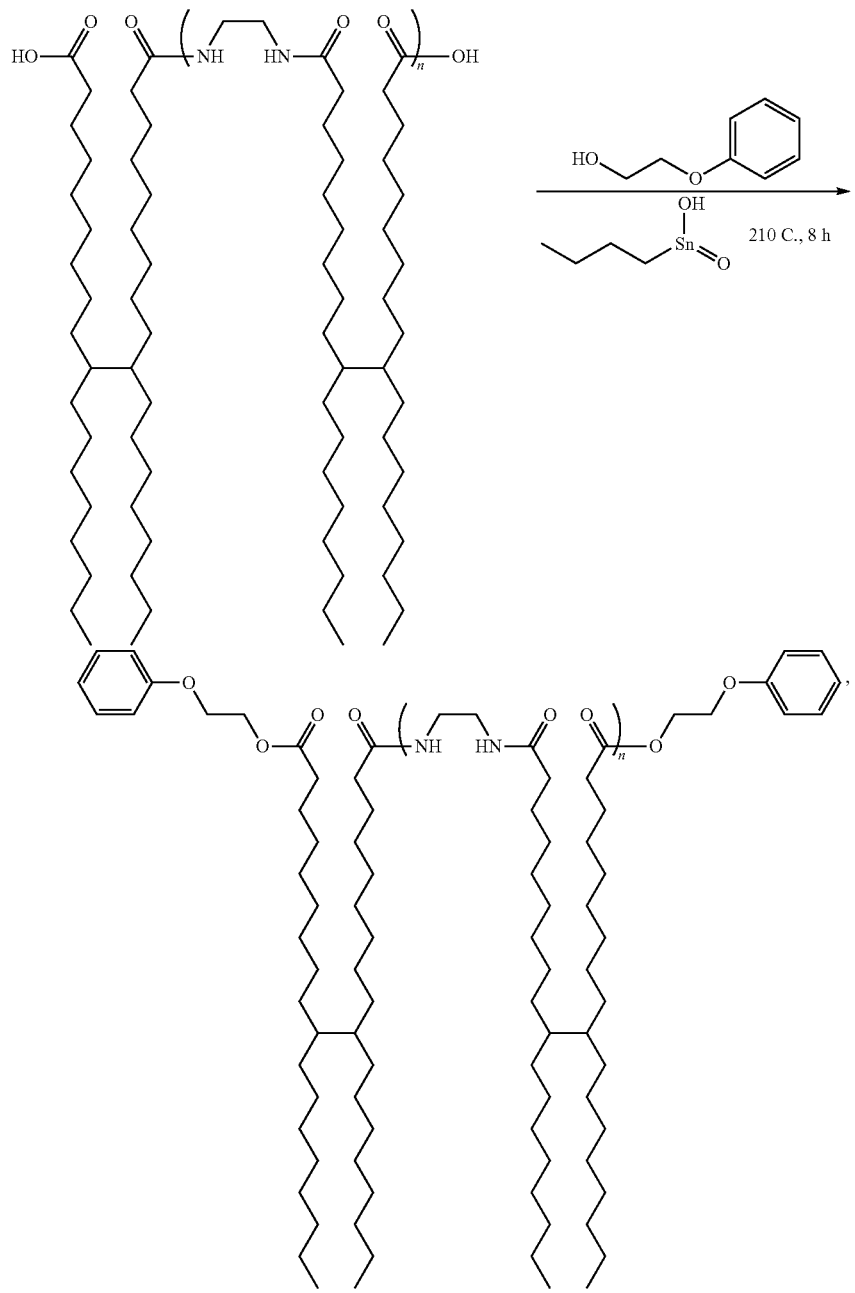

The oligomeric distributions for Examples 2A, 2B, and 2C are summarized in Table 1 (following Example 2C).

Example 2A

Preparation of the Amide Gellant (Baseline)

A baseline amide gellant precursor using a EDA:Pripol ratio of 1.125:2 was prepared as follows. See FIG. 2A. To a 2 L stainless steel Buchi reactor equipped with 4-blade steel impeller, baffle, and condenser was added organoamide (711.8 g, acid number=133.7, 614.65 mmol) via the addition port, using a heat gun to melt the materials. Next, the reactor was purged with $N_2$ gas at 3 SCFH (standard cubic feet per hour) flow rate, and heated to 210° C., and mixing at 450 RPM was started. Next, 2-phenoxyethanol (281.2 g, 2035.4 mmol, Aldrich Chemicals) and Fascat 4100 (0.70 g, 2.05 mmol, Arkema Inc.) were premixed in a beaker, and added to the reaction. The reaction port was closed, and the reaction was held at 210° C. for 2.5 hours. After 2.5 hours, the reactor port was opened, and 27.5 g more phenoxyethanol was added, and the reaction was allowed to run for 4 hours. After the reaction was completed, the molten gellant product was discharged into a foil pan and allowed to cool to room temperature. The produce was an amber-colored firm gel. Acid number=3.9.

Examples 2B

Preparation of the Amide Gellant (Low Molecular Weight)

A low molecular weight amide gellant precursor using a EDA:Pripol ratio of 0.25:2 was prepared as follows. See FIG. 2B. To a 2 L s/s Buchi reactor equipped with 4-blade steel impeller, baffle, and condenser was added organoamide (423.4 g, 636 mmol) via the addition port, using a heat gun to melt the materials. Next, the reactor was purged with $N_2$@3 SCFH (standard cubic feet per hour) flow rate, and heated to 165° C. Next, 2-phenoxyethanol (191 ml, 1527 mmol, Aldrich Chemicals) and Fascat 4100 (0.45 g, 2.155 mmol) were premixed in a beaker, and added to the reaction. The reaction port was closed, and ramped to 210° C. and held for 7 h. After 3 hours of reaction time, the reactor port was opened, and 22 mL more phenoxyethanol was added. After the reaction was completed, the molten gellant product was discharged into a foil pan and allowed to cool to room temperature. The produce was an soft, amber-coloured rubbery jelly. Acid number=0.65.

Example 2C

Preparation of the Amide Gellant (High MW)

A high MW amide gellant precursor using a EDA:Pripol ratio of 1.5:2 was prepared as follows. See FIG. 2C. To a 2 L s/s Buchi reactor equipped with 4-blade steel impeller, baffle, and condenser was added organoamide (502.16 g, 248 mmol) via the addition port, using a heat gun to melt the materials. Next, the reactor was purged with $N_2$@3 SCFH (standard cubic feet per hour) flow rate, and heated to 165° C. Next, 2-phenoxyethanol (74.8 ml, 596 mmol, Aldrich Chemicals) and Fascat 4100 (0.45 g, 2.155 mmol) were premixed in a beaker, and added to the reaction. The reaction port was closed, and ramped to 210° C. and held for 7 h. After 3 hours of reaction time, the reactor port was opened, and 22 mL more phenoxyethanol was added. After the reaction was completed, the molten gellant product was discharged into a foil pan and allowed to cool to room temperature. The produce was a hard, pale-amber-coloured rubber. Acid number=1.2.

TABLE 1

Mw Distributions by MALDI-TOF of Amide Gellants

| n | Name | Example 2A | Example 2B | Example 2C |
|---|------|------------|------------|------------|
| 0 | Unimer | 26.7 | 59.1 | 33.3 |
| 1 | Dimer | 57.6 | 20.4 | 25.5 |
| 2 | Trimer | 14.7 | 9.5 | 20.5 |
| 3 | Tetramer | 0.9 | 5 | 11.5 |

Example 3

Preparation of UV Curable Inks Containing Gellants

| Component | Wt % | Mass/g |
|-----------|------|--------|
| Amide gellant (2A/2B/2C) | 7.5 | 15 |
| Unilin 350 acrylate | 5.0 | 10 |
| SR833S monomer | 61.47 | 129.5 |
| SR399LV | 5.0 | 10 |
| Irgacure 379 | 3.0 | 6 |
| Irgacure 819 | 0.5 | 1 |
| Esacure KIP 150 | 4.0 | 8 |
| Irgastab UV10 | 0.2 | 0.4 |
| Cyan pigment dispersion (15% (Spectrapac C/SR9003) | 13.33 | 20 |
| TOTAL | 100% | 200 |

Procedure: To a 600 mL beaker immersed in a griffin heating mantle fitted to a temperature controller was added monomer, gellant, wax, photoinitiator and stabilizer. The mixture was heated to 90° C. and an overhead mixer was immersed into the beaker. The mixture was stirred until the mixture was clear and homogeneous. Next, a homogenizer (T-25, IKA) was immersed into the ink base, pigment concentrate was added and the ink was homogenized at 15,000 RPM for 30 minutes. Finally, the ink was filtered through a heated 1 μm filter (Parker) and the finished ink was allowed to cool to room temperature.

Example 3A

Cyan Ink (Nominal Gellant)

Ink was prepared using the amide gellant described in Example 2A.

Example 3B

Cyan Ink (Low MW Gellant)

Ink was prepared using the amide gellant described in Example 2B.

Example 3C

Cyan Ink (High MW Gellant)

Ink was prepared using the amide gellant described in Example 2C.

Example 3D

Ink Properties

Figure 3:
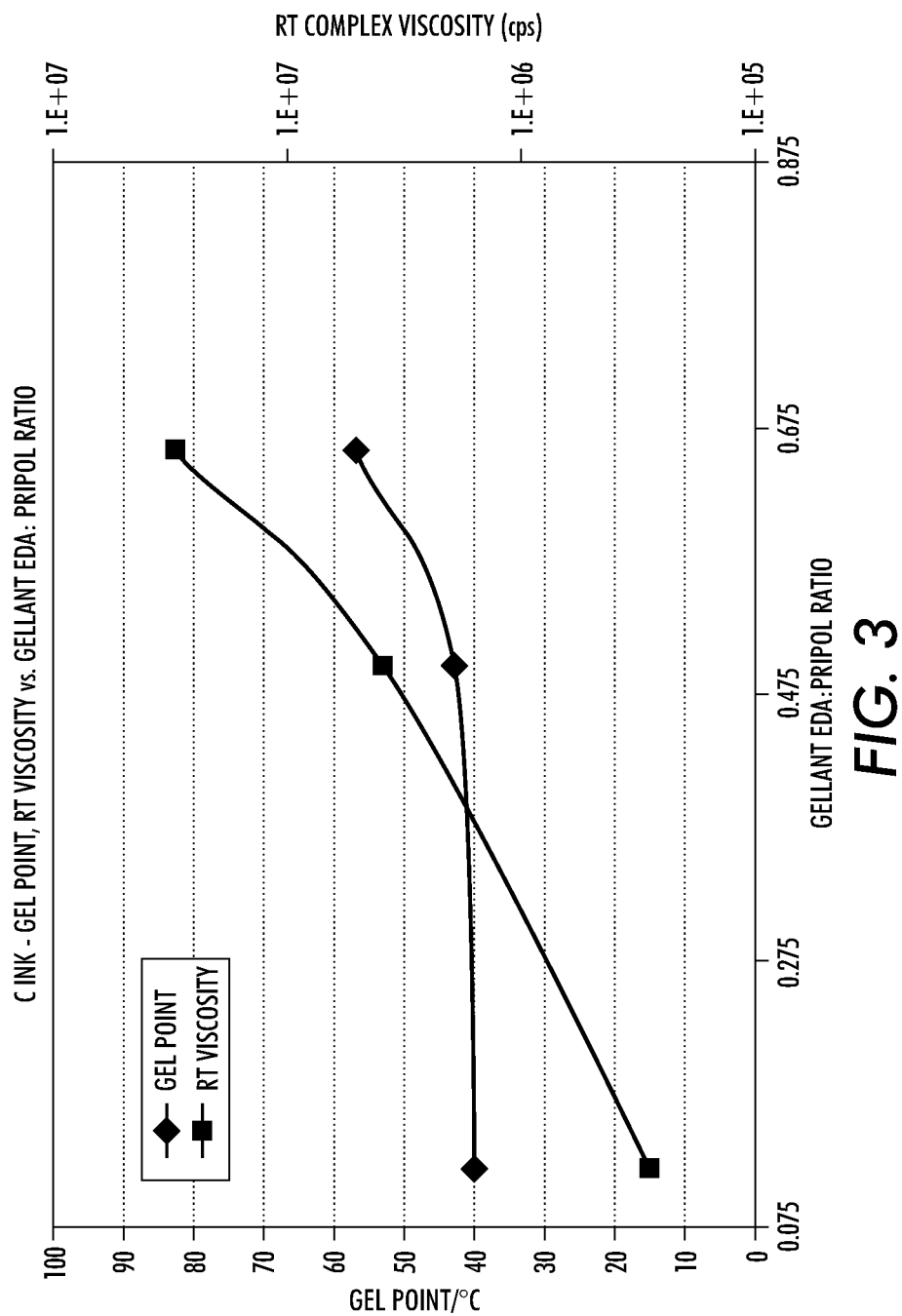

FIG. 2 shows the complex viscosity profiles for the 3 inks made with nominal, low molecular weight and high molecular weight gellants, Examples, 3A, 3B, and 3C respectively. Gellants of varying molecular weight distributions have been formulated into inks, and the resultant viscosity changes were tracked by a plot of the gel point and room temperature viscosity. See FIG. 3. Generally, the viscosity (jetting temp and room temp (RT)) and the phase change onset of the ink composition is strongly influenced by the molecular weight of the gellant. Ink prepared with low molecular weight gellant (ink Example 3B) may exhibit a poorly defined transition temperature for phase change (gradual change in slope) and reduced ultimate RT viscosity (<$10^6$ cps). Ink prepared with high molecular weight gellant (Ink example 3C) may exhibit too high a jetting viscosity (~20 cps at 90° C.) and onset of phase change at too high a temperature (75° C.) which can be problematic for jetting. Ink prepared with the nominal MW gellant (ink Example 3A) exhibits the appropriate jetting viscosity (13 cps at 90° C.), target onset temperature of phase change (60° C.), and suitable RT viscosity (10⁶ cps).

Based on current data, the optimal distribution ranges for the following species, for ranges of n from 1 to 5 are shown below in Table 2.

TABLE 2

Molecular Weight Distributions by MALDI-TOF of Amide Gellant

| n | Name | Percent ranges |
|---|------|----------------|
| 0 | Unimer | 40-60 |
| 1 | Dimer | 15-25 |
| 2 | Trimer | 7.5-10 |
| 3 | Tetramer | 5-7.5 |

(Distributions were determined by MALDI-TOF (matrix assisted laser desorption ionization-time of flight) mass spectrometry)

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others. Unless specifically recited in a claim, steps or components of claims should not be implied or imported from the specification or any other claims as to any particular order, number, position, size, shape, angle, color, or material.

All the patents and applications referred to herein are hereby specifically, and totally incorporated herein by reference in their entirety in the instant specification.

What is claimed is:

1. A curable solid ink comprising a curable wax; one or more monomers; a gellant oligomer mixture composition, a photoinitiator, and an optional colorant, wherein gellant oligomer mixture composition comprises a blend of oligomers of an ester-terminated polyamide gellant of the formula:

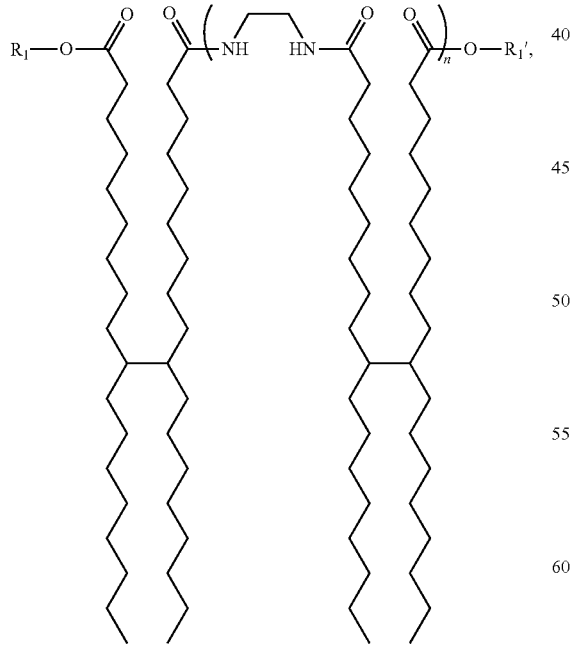

wherein n is 1 to 12, and wherein $R_1$ and $R_1'$ each, independently of the other, are aromatic groups selected from the group consisting of:

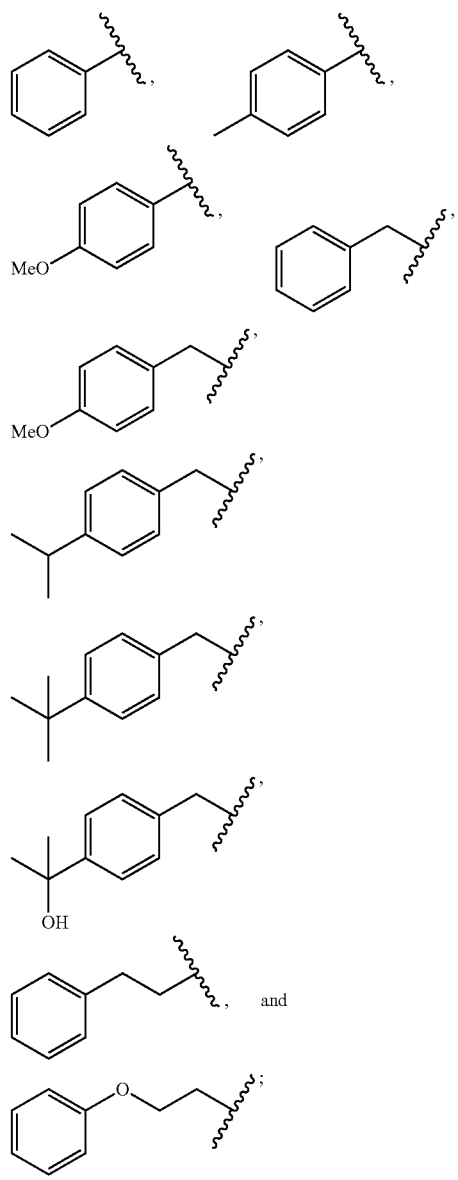

wherein the blend of a oligomers is selected from two or more of the group consisting of a unimer, a dimer, a trimer, a tetramer, a pentamer, a hexamer, a heptamer, a octamer, a nonamer, a decamer, a undecamer, and a dodecamer and further wherein the gellant oligomer mixture composition is present in the curable solid ink in an amount of from about 1 to about 30% by weight of the total weight of the curable solid ink.

2. The curable solid ink of claim 1, wherein the gellant oligomer mixture composition comprises a blend of oligomers made up of three or more, in any combination or mixture, of the oligomers selected from the group consisting of: a unimer, a dimer, a trimer, a tetramer, a pentamer, a hexamer, a heptamer, a octamer, a nonamer, a decamer, a undecamer, and a dodecamer.

3. The curable solid ink of claim 1, wherein the gellant oligomer mixture composition comprises a blend of oligomers made up of four or more, in any combination or mixture, of the oligomers selected from the group consisting of: a unimer, a dimer, a trimer, a tetramer, a pentamer, a hexamer, a heptamer, a octamer, a nonamer, a decamer, a undecamer, and a dodecamer.

4. The curable solid ink of claim 1, wherein the gellant oligomer mixture composition comprises a blend of oligomers made up of five or more, in any combination or mixture, of the oligomers selected from the group consisting of: a unimer, a dimer, a trimer, a tetramer, a pentamer, a hexamer, a heptamer, a octamer, a nonamer, a decamer, a undecamer, and a dodecamer.

5. The curable solid ink of claim 1, wherein the gellant oligomer mixture composition comprises from about 40 to about 60% unimer, from about 15 to about 25% dimer, from about 7.5 to about 10% trimer, and from about 5 to about 7.5% tetramer.

6. The curable solid ink of claim 1, wherein the curable wax is present in the curable solid ink in an amount of from about 0.1 to about 30% by weight of the total weight of the curable solid ink.

7. The curable solid ink of claim 1, wherein the one or more monomers are present in the curable solid ink in an amount of from about 50 to about 95% by weight of the total weight of the curable solid ink.

8. The curable solid ink of claim 1, wherein the optional colorant is present in the curable solid ink in an amount of from about 0.1 to about 10% by weight of the total weight of the curable solid ink.

9. The curable solid ink of claim 1, wherein the photoinitiator is present in the curable solid ink in an amount of from about 0.5 to about 15% by weight of the total weight of the curable solid ink.

10. A method of jet printing an image, comprising:
jetting a curable solid ink onto a print substrate to form an image; and exposing the image to radiation to cure the curable solid ink on to the print substrate,
wherein the curable solid ink comprises a curable wax; one or more monomers; a gellant oligomer mixture composition, a photoinitiator, and an optional colorant, wherein gellant oligomer mixture composition comprises a blend of oligomers of an ester-terminated polyamide gellant of the formula:

$$R_1-O-\overset{O}{\underset{}{\text{C}}}-\cdots-\overset{O}{\underset{}{\text{C}}}-NH-\cdots-HN-\overset{O}{\underset{}{\text{C}}}-\cdots-\overset{O}{\underset{}{\text{C}}}-O-R_1',$$

(with n repeating units)

wherein n is 1 to 12, and wherein $R_1$ and $R_1'$ each, independently of the other, are aromatic groups selected from the group consisting of:

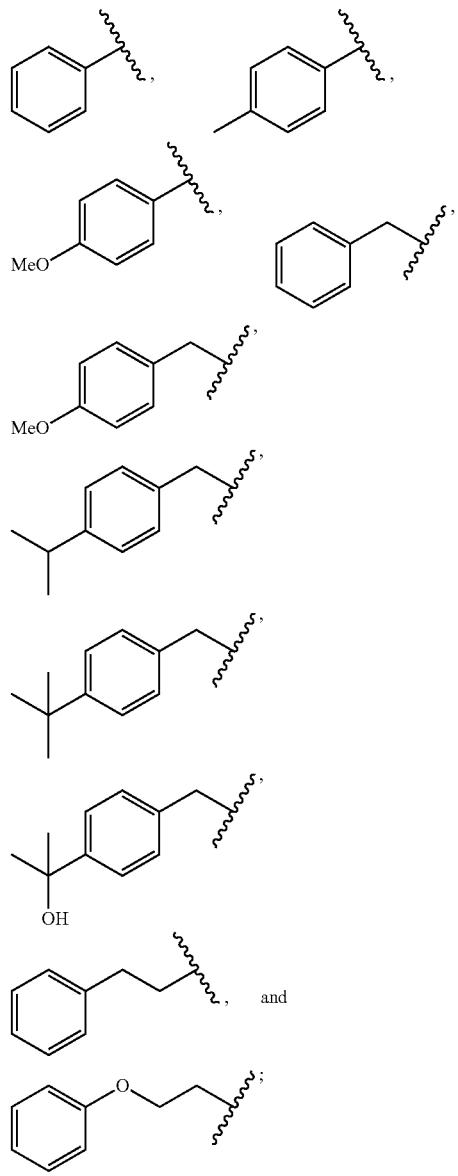

wherein the blend of a oligomers is consisting of a unimer, a dimer, a trimer, a tetramer, a pentamer, and a hexamer and further wherein the gellant oligomer mixture composition is present in the curable solid ink in an amount of from about 1 to about 30% by weight of the total weight of the curable solid ink.

11. The method of claim 10, wherein the blend of oligomers is made up of three or more, in any combination or mixture, of the oligomers selected from the group consisting of: a unimer, a dimer, a trimer, a tetramer, a pentamer, a hexamer, a heptamer, a octamer, a nonamer, a decamer, a undecamer, and a dodecamer.

12. The method of claim 10, wherein the blend of oligomers is made up of four or more, in any combination or mixture, of the oligomers selected from the group consisting of: a unimer, a dimer, a trimer, a tetramer, a pentamer, a hexamer, a heptamer, a octamer, a nonamer, a decamer, a undecamer, and a dodecamer.

13. The method of claim 10, wherein the blend of oligomers is made up of five or more, in any combination or mixture, of the oligomers selected from the group consisting of: a unimer, a dimer, a trimer, a tetramer, a pentamer, a hexamer. a heptamer, a octamer, a nonamer, a decamer, a undecamer, and a dodecamer.

14. The method of claim 10, wherein the gellant oligomer mixture composition comprises from about 40 to about 60% unimer, from about 15 to about 25% dimer, from about 7.5 to about 10% trimer, and from about 5 to about 7.5% tetramer.

* * * * *